US012596630B2

(12) United States Patent
Mola

(10) Patent No.: US 12,596,630 B2
(45) Date of Patent: Apr. 7, 2026

(54) PROCESSOR SUPPORT FOR USING MEMORY PAGE MARKINGS AS LOGGING CUES TO SIMULTANEOUSLY RECORD PLURAL EXECUTION CONTEXTS INTO INDEPENDENT EXECUTION TRACES

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 18/553,820

(22) PCT Filed: Apr. 18, 2022

(86) PCT No.: PCT/US2022/071782
§ 371 (c)(1),
(2) Date: Oct. 3, 2023

(87) PCT Pub. No.: WO2022/226486
PCT Pub. Date: Oct. 27, 2022

(65) Prior Publication Data
US 2024/0184688 A1 Jun. 6, 2024

(30) Foreign Application Priority Data
Apr. 20, 2021 (LU) ........................................ 500060

(51) Int. Cl.
*G06F 11/362* (2025.01)
*G06F 11/30* (2006.01)
*G06F 12/0891* (2016.01)

(52) U.S. Cl.
CPC ...... *G06F 11/3636* (2013.01); *G06F 11/3037* (2013.01); *G06F 12/0891* (2013.01); *G06F 2201/885* (2013.01)

(58) Field of Classification Search
CPC ............ G06F 11/3636; G06F 11/3037; G06F 12/0891; G06F 2201/885
(Continued)

(56) References Cited

U.S. PATENT DOCUMENTS

| | | | |
|---|---|---|---|
| 7,917,698 B2 * | 3/2011 | Cypher | G06F 12/0842 |
| | | | 711/E12.04 |
| 9,678,883 B2 * | 6/2017 | Liu | G06F 12/0844 |

(Continued)

OTHER PUBLICATIONS

Holliday, Mark. "Techniques for cache and memory simulation using address reference traces." International journal in computer simulation 1.1 (1991): pp. 129-151. (Year: 1991).*

(Continued)

*Primary Examiner* — Satish Rampuria
(74) *Attorney, Agent, or Firm* — Workman Nydegger

(57) ABSTRACT

Using memory markings to record plural execution contexts into independent traces. A processor detects a memory operation and identifies an associated memory marking from among a first marking indicating that a first memory region is logged for the first context, and a second marking indicating that a second memory region is logged for a second context. Based on identifying the memory marking as the second marking, and based the first context causing the memory operation, the processor performs at least one of: when the memory operation causes an influx into a cache, logging the influx to a second trace associated with the second context; when the memory operation is a read, logging the read to a first trace associated with the first context; or when the memory operation is a write, performing one of logging the write to the second trace, or evicting a target cache line.

19 Claims, 13 Drawing Sheets

(58) Field of Classification Search
USPC ......................................................... 717/128
See application file for complete search history.

(56) References Cited

U.S. PATENT DOCUMENTS

| | | | | |
|---|---|---|---|---|
| 2009/0113131 A1* | 4/2009 | Cypher | ................. | G06F 12/126 |
| | | | | 711/E12.04 |
| 2018/0113809 A1 | 4/2018 | Mola | | |
| 2019/0087305 A1 | 3/2019 | Mola | | |
| 2019/0213065 A1* | 7/2019 | Gabryjelski | .......... | G06F 11/362 |
| 2019/0266086 A1* | 8/2019 | Mola | ................... | G06F 11/3476 |
| 2020/0201776 A1* | 6/2020 | Isenegger | ........... | G06F 12/0879 |
| 2024/0007492 A1* | 1/2024 | Shen | ................... | H04L 63/1416 |

OTHER PUBLICATIONS

Ledvinka, Martin, and Petr Kremen. "A comparison of object-triple mapping frameworks." 2018, pp. 1-44. (Year: 2018).*
Kathiravelu, Pradeeban, et al. "JikesRVM: Internal Mechanisms Study and Garbage Collection with MMTk." arXiv preprint arXiv: 1601.02536 (2016). pp. 1-17. (Year: 2016).*
Sumner, William N., and Xiangyu Zhang. "Memory indexing: Canonicalizing addresses across executions." Proceedings of the eighteenth ACM SIGSOFT international symposium on Foundations of software engineering. 2010. pp. 217-226. (Year: 2010).*
Huang, Jeff, Charles Zhang, and Julian Dolby. "Clap: Recording local executions to reproduce concurrency failures." Acm Sigplan Notices 48.6 (2013): pp. 141-152. (Year: 2013).*
"Search Report and Written Opinion Issued in Luxembourg Patent Application No. LU500060", Mailed Date: Dec. 24, 2021, 9 Pages.
"International Search Report and Written Opinion Issued in PCT Application No. PCT/US22/071782", Mailed Date: Jun. 21, 2022, 14 Pages.

* cited by examiner

100

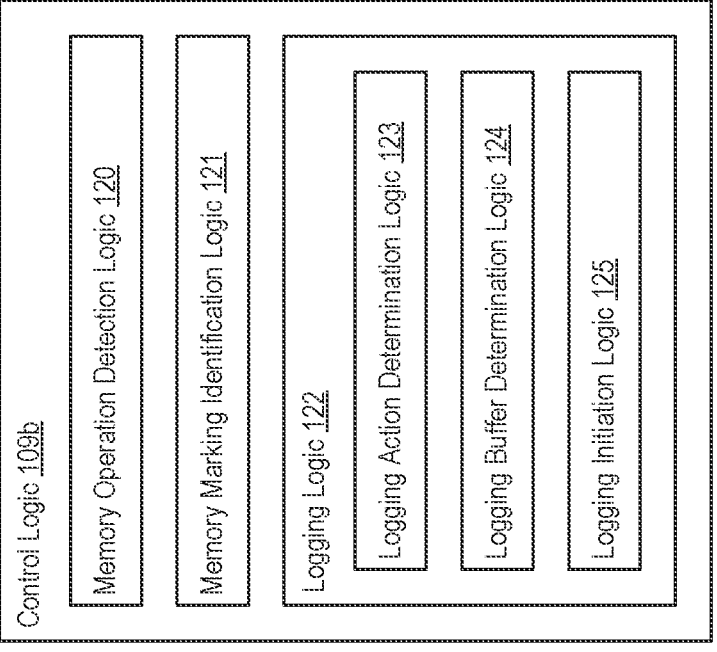

Control Logic 109b

Memory Operation Detection Logic 120

Memory Marking Identification Logic 121

Logging Logic 122

Logging Action Determination Logic 123

Logging Buffer Determination Logic 124

Logging Initiation Logic 125

FIG. 1C

Control Logic 109a

Cache Way-Locking Logic 114

Memory Operation Detection Logic 115

Logging Logic 116

Logging Action Determination Logic 117

Logging Buffer Determination Logic 118

Logging Initiation Logic 119

| 302a | 302b | 302c |
|------|------|------|
|      |      |      |
|      |      |      |
|      |      |      |
| ... | ... | ... |

| | 902a   Context A's Reserved Way(s) | 902b   Context B's Reserved Way(s) | 902c   Unreserved Way(s) |
|---|---|---|---|
| 901a   Context A (Recorded) | 903   Influx: Log To A's Trace   Read: No Logging   Write: No Logging | 904   Influx: Log To B's Trace   Read: Log To A's Trace   Write: Log To B's Trace, Or Evict | 905   Influx: No Logging   Read: Log To A's Trace   Write: No Logging |
| 901b   Context B (Recorded) | 906   Influx: Log To A's Trace   Read: Log To B's Trace   Write: Log To A's Trace, Or Evict | 907   Influx: Log To B's Trace   Read: No Logging   Write: No Logging | 908   Influx: No Logging   Read: Log To B's Trace   Write: No Logging |
| 901c   Unrecorded Context(s) | 909   Influx: Log To A's Trace   Read: No Logging   Write: Log to A's Trace, Or Evict | 910   Influx: Log To B's Trace   Read: No Logging   Write: Log To B's Trace, Or Evict | 911   Influx: No Logging   Read: No Logging   Write: No Logging |

| | 1002a  Logged Page(s) For Context A | 1002b  Logged Page(s) For Context B | 1002c  Logged Page(s) For Context A&B | 1002d  Non-Logged Page(s) |
|---|---|---|---|---|
| 1001a  Context A (Recorded) | 1003  Influx: Log To A's Trace Read: No Logging Write: No Logging | 1004  Influx: Log To B's Trace Read: Log To A's Trace Write: Log To B's Trace, Or Evict | 1005  Influx: Log To A&B's Traces Read: No Logging Write: Log To B's Trace, Or Evict | 1006  Influx: No Logging Read: Log To A's Trace Write: No Logging |
| 1001b  Context B (Recorded) | 1007  Influx: Log To A's Trace Read: Log To B's Trace Write: Log to A's Trace, Or Evict | 1008  Influx: Log To B's Trace Read: No Logging Write: No Logging | 1009  Influx: Log To A&B's Traces Read: No Logging Write: Log To A's Trace, Or Evict | 1010  Influx: No Logging Read: Log To B's Trace Write: No Logging |
| 1001c  Unrecorded Context(s) | 1011  Influx: Log To A's Trace Read: No Logging Write: Log To A's Trace, Or Evict | 1012  Influx: Log To B's Trace Read: No Logging Write: Log To B's Trace, Or Evict | 1013  Influx: Log To A&B's Traces Read: No Logging Write: Log To A&B's Traces, Or Evict | 1014  Influx: No Logging Read: No Logging Write: No Logging |

FIG. 10

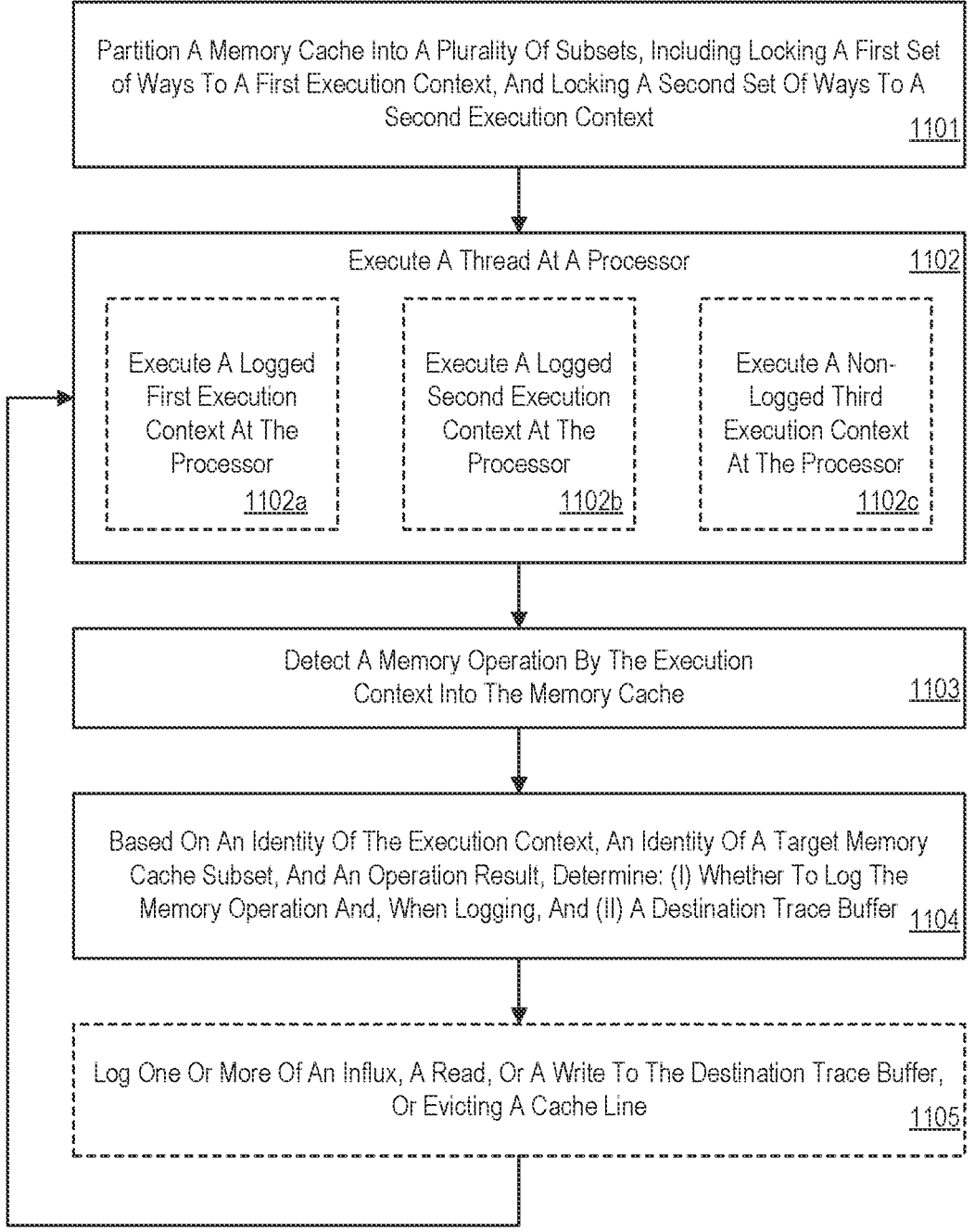

1100

Partition A Memory Cache Into A Plurality Of Subsets, Including Locking A First Set of Ways To A First Execution Context, And Locking A Second Set Of Ways To A Second Execution Context    1101

Execute A Thread At A Processor    1102

Execute A Logged First Execution Context At The Processor    1102a

Execute A Logged Second Execution Context At The Processor    1102b

Execute A Non-Logged Third Execution Context At The Processor    1102c

Detect A Memory Operation By The Execution Context Into The Memory Cache    1103

Based On An Identity Of The Execution Context, An Identity Of A Target Memory Cache Subset, And An Operation Result, Determine: (I) Whether To Log The Memory Operation And, When Logging, And (II) A Destination Trace Buffer    1104

Log One Or More Of An Influx, A Read, Or A Write To The Destination Trace Buffer, Or Evicting A Cache Line    1105

FIG. 11

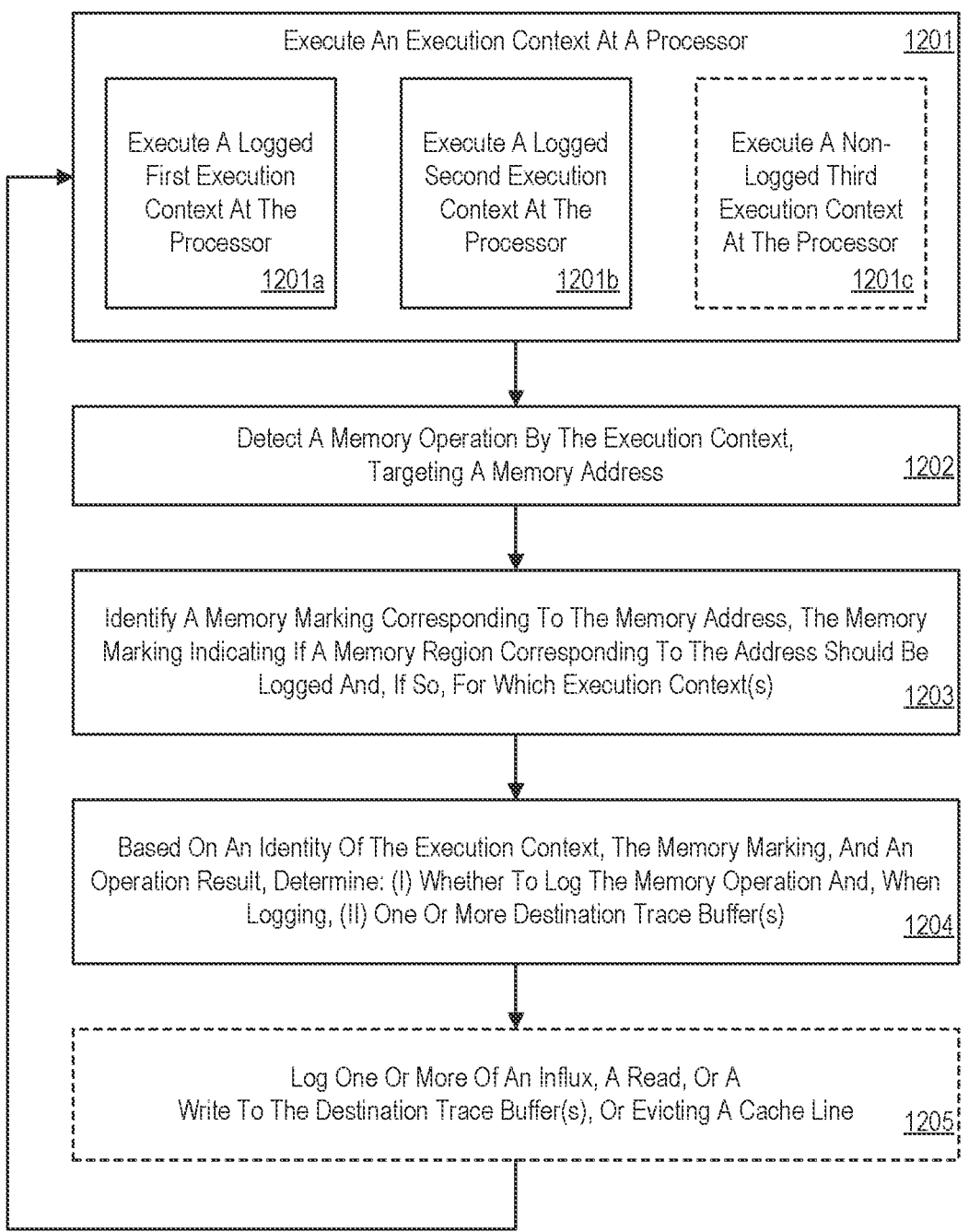

1200

Execute An Execution Context At A Processor    1201

Execute A Logged First Execution Context At The Processor    1201a

Execute A Logged Second Execution Context At The Processor    1201b

Execute A Non-Logged Third Execution Context At The Processor    1201c

Detect A Memory Operation By The Execution Context, Targeting A Memory Address    1202

Identify A Memory Marking Corresponding To The Memory Address, The Memory Marking Indicating If A Memory Region Corresponding To The Address Should Be Logged And, If So, For Which Execution Context(s)    1203

Based On An Identity Of The Execution Context, The Memory Marking, And An Operation Result, Determine: (I) Whether To Log The Memory Operation And, When Logging, (II) One Or More Destination Trace Buffer(s)    1204

Log One Or More Of An Influx, A Read, Or A Write To The Destination Trace Buffer(s), Or Evicting A Cache Line    1205

FIG. 12

PROCESSOR SUPPORT FOR USING MEMORY PAGE MARKINGS AS LOGGING CUES TO SIMULTANEOUSLY RECORD PLURAL EXECUTION CONTEXTS INTO INDEPENDENT EXECUTION TRACES

CROSS-REFERENCE TO RELATED APPLICATIONS

The present application is a U.S. National Stage of International Application No. PCT/US2022/071782, filed on Apr. 18, 2022, designating the United States and claiming the priority of Luxembourg Patent Application No. LU500060 filed with the Luxembourg Intellectual Property Office on Apr. 20, 2021. All of the aforementioned applications are incorporated herein in their respective entireties by this reference.

TECHNICAL FIELD

The present disclosure relates to systems, methods, and devices that record replayable execution traces based on logging processor caching activity.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors are triggered by a vast variety of factors such as data inputs, user inputs, race conditions (e.g., when accessing shared resources), etc. Given the variety of triggers, undesired software behaviors are often rare and seemingly random, and extremely difficult to reproduce. As such, it is often very time-consuming and difficult for a developer to identify a given undesired software behavior. Once an undesired software behavior has been identified, it is again often time-consuming and difficult to determine its root cause (or causes).

Developers use a variety of approaches to identify undesired software behaviors, and to then identify one or more locations in an application's code that cause the undesired software behavior. For example, developers often test different portions of an application's code against different inputs (e.g., unit testing). As another example, developers often reason about execution of an application's code in a debugger (e.g., by setting breakpoints/watchpoints, by stepping through lines of code, etc. as the code executes). As another example, developers often observe code execution behaviors (e.g., timing, coverage) in a profiler. As another example, developers often insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of an execution context is recorded into one or more trace files (i.e., an execution trace). Using some tracing techniques, an execution trace can contain "bit-accurate" historic execution trace data, which enables any recorded portion the traced execution context to be virtually "replayed" (e.g., via emulation) down to the granularity of individual instructions (e.g., machine code instructions, intermediate language code instructions, etc.). Thus, using bit-accurate trace data, diagnostic tools enable developers to reason about a recorded prior execution of a subject execution context, as opposed to conventional debugging which is limited to a "live" forward execution. For example, using replayable execution traces, some historic debuggers provide user experiences that enable both forward and reverse breakpoints/watchpoints, that enable code to be stepped through both forwards and backwards, etc. Some historic profilers, on the other hand, are able to derive code execution behaviors (e.g., timing, coverage) from prior-executed code.

Some techniques for recording execution traces operate based largely on a processor recording detecting, and initiating logging of, influxes to its memory cache. However, since modern processors commonly execute at the rate of tens- to hundreds- of thousands of MIPS (millions of instructions per second), replayable execution traces of a program's thread can capture vast amounts of information, even if mere fractions of a second of the thread's execution are captured. As such, replayable execution traces quickly grow very large in size in memory and/or on disk.

BRIEF SUMMARY

While already known processor-based tracing techniques that produce bit-accurate traces can record simultaneous/interleaved execution of plural execution contexts (e.g., threads) into a common trace buffer, these processor-based bit-accurate tracing techniques cannot record simultaneous/interleaved execution of plural execution contexts into separate and distinct replayable traces-particularly when those execution contexts interact with common shared memory. This is the case, in large part, because none of these prior techniques can determine a particular trace data stream from among a plurality of trace data streams into which the data of a given cache line should be logged—and particularly when that trace data stream not the trace data stream associated with a current execution context (e.g., because the cache line corresponds to shared memory shared by more than one execution context). Thus, when recording plural execution contexts, these known bit-accurate tracing techniques are limited to recording all traced execution contexts into the same execution trace.

Overcoming these limitations, least some embodiments described herein are directed to processor support for recording simultaneous/interleaved execution of plural execution contexts into corresponding independently-replayable execution traces. Conceptually, these embodiments involve tracking whether a memory operation that is caused by execution of a given execution context (whether that execution context is being traced or not) either (i) influxes memory data into a cache, or (ii) modifies already cached memory data, where the memory data is associated with any other execution context whose execution is being traced. When an execution context's execution does cause a memory operation that influxes or modifies memory data associated with another execution context whose execution is being traced, these embodiments log the effects of the memory operation into a dedicated execution trace corresponding to the appropriate traced execution context. When these embodiments are combined with additional cache-based logging caused by execution of the traced execution contexts, themselves, into their corresponding execution traces, each recorded execution trace stores sufficient data to reproduce the cache state needed to support replay of all memory operations that were actually performed by that execution trace's corresponding execution context. Thus, these embodiments enable independently-replayable execution traces to be recorded during simultaneous/interleaved execution of plural execution contexts.

Some embodiments are directed to processor support for using cache way-locking to simultaneously record plural execution contexts into independent execution traces. In these embodiments, each of a plurality of sets of one or more ways in a memory cache is locked to a corresponding one of a plurality of traced execution contexts. In general, when any execution context other than a particular execution context to which a particular set of way(s) is locked causes an influx or a write into that particular set of way(s), these embodiments log the influx/write into the particular execution context's execution trace. When combined with other cache way-locking tracing techniques that record memory operations caused by execution of each traced execution context, itself, these embodiments enable each execution trace to contain memory data sufficient to replay memory operations of the execution trace's corresponding traced execution context. These embodiments therefore utilize memory cache way-locking features to determine an execution trace into which the effects of a given memory operation should be recorded, in order to achieve a technical effect of efficiently recording independently-replayable execution traces during simultaneous/interleaved execution of plural execution contexts.

In accordance with the foregoing, some embodiments are directed to methods, systems, and computer program products for using cache way-locking to simultaneously record plural execution contexts into independent execution traces. In one implementation, a processor comprises a processing unit and a memory cache. The processor also comprises control logic that configures the processor to partition the memory cache into a plurality of memory cache subsets. The plurality of memory cache subsets include: (i) a first memory cache subset comprising a first set of memory cache ways that are locked to a first execution context whose execution is being recorded into a first trace buffer, and (ii) a second memory cache subset comprising a second set of memory cache ways that are locked to a second execution context whose execution is being recorded into a second trace buffer. The control logic also configures the processor to detect a memory operation by the first execution context into the second memory cache subset. The control logic also configures the processor to, in response to detecting the memory operation, perform at least one of: (i) when the memory operation causes an influx into the second memory cache subset, initiate logging of the influx to the second trace buffer; (ii) when the memory operation is a read from the second memory cache subset, initiate logging of the read to the first trace buffer; or (iii) when the memory operation is a write to the second memory cache subset, perform one of (a) initiating logging of the write to the second trace buffer, or (b) evicting a cache line that is a target of the write.

Other embodiments are directed to processor support for using memory page markings as logging cues to simultaneously record plural execution contexts into independent execution traces. In these embodiments, different memory regions (e.g., pages) are tagged as being logged for one or more of a plurality of execution contexts, or as being non-logged. In general, when any execution context other than a particular execution context for which a particular memory region is tagged as logged causes an influx from, or a write to, that particular memory region, these embodiments log the influx/write into the particular execution context's execution trace. When combined with other memory page marking tracing techniques that record memory operations caused by execution of each traced execution context, itself, these embodiments enable each execution trace to contain memory data sufficient to replay memory operations of the execution trace's corresponding traced execution context. These embodiments therefore utilize memory page markings as logging cues to determine an execution trace into which the effects of a given memory operation should be recorded, in order to achieve a technical effect of efficiently recording independently-replayable execution traces during simultaneous/interleaved execution of plural execution contexts.

In accordance with the foregoing, some embodiments are directed to methods, systems, and computer program products for using memory page markings as logging cues to simultaneously record plural execution contexts into independent execution traces. In one implementation, a processor comprises a processing unit and a memory cache. The processor also comprises control logic that configures the processor to detect a memory operation resulting from execution of a first execution context. The memory operation targets a memory address. The control logic also configures the processor to, based on detecting the memory operation, identify a corresponding memory marking for the memory operation. The corresponding memory marking is one of a plurality of memory markings that include: (i) a first memory marking indicating that a first memory region is logged for the first execution context, and (ii) a second memory marking indicating that a second memory region is logged for a second execution context. Execution of the first execution context is recorded into a first trace buffer, and execution of the second execution context is recorded into a second trace buffer. The control logic also configures the processor to, based on identifying the corresponding memory marking as being the second memory marking, and based on the memory operation resulting from execution of the first execution context, perform at least one of: (i) when the memory operation causes an influx into the memory cache, initiating logging of the influx to the second trace buffer; (ii) when the memory operation is a read from the memory cache, initiating logging of the read to the first trace buffer; or (iii) when the memory operation is a write to the memory cache, performing one of (a) initiating logging of the write to the second trace buffer, or (b) evicting a cache line that is a target of the write.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1B illustrates an example of processor control logic that uses cache way-locking to simultaneously record plural execution contexts into independent execution traces;

FIG. 1C illustrates an example of processor control logic that uses memory page markings as logging cues to simultaneously record plural execution contexts into independent execution traces;

FIG. 3 illustrates an example of a memory cache;

FIG. 9 illustrates an example matrix of logging actions for using way-locking to record simultaneous execution of plural execution contexts into independently-replayable execution traces;

FIG. 10 illustrates an example matrix of logging actions for using memory page markings as logging cues to record simultaneous execution of plural execution contexts into independently-replayable execution traces;

FIG. 11 illustrates a flow chart of an example method for using cache way-locking to simultaneously record plural execution contexts into independent execution traces; and FIG. 12 illustrates a flow chart of an example method for using memory page markings as logging cues to simultaneously record plural execution contexts into independent execution traces.

DETAILED DESCRIPTION

Figure 1A:
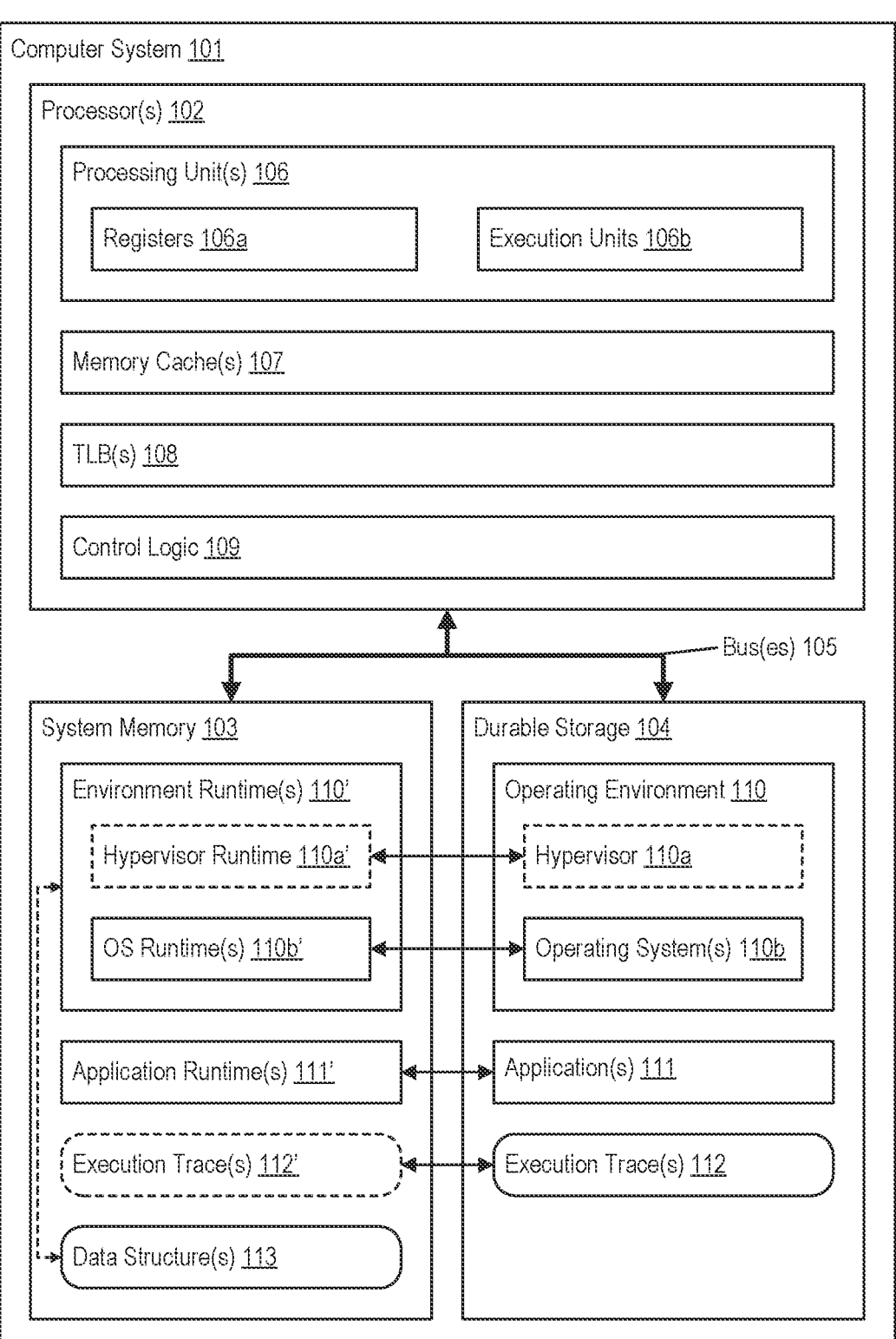
FIG. 1A illustrates an example computing environment that facilitates one or more of (i) using cache way-locking to simultaneously record plural execution contexts into independent execution traces, or (ii) using memory page markings as logging cues to simultaneously record plural execution contexts into independent execution traces.

FIG. 1A illustrates an example computing environment 100 that facilitates one or more of (i) using cache way-locking to simultaneously record plural execution contexts into independent execution traces, or (ii) using memory page markings as logging cues to simultaneously record plural execution contexts into independent execution traces. As illustrated, computing environment 100 includes a computer system 101 (e.g., a special-purpose or general-purpose computing device), which includes a processor 102 (or a plurality of processors) that is configured to participate in recording bit-accurate execution traces, including recording simultaneous/interleaved execution of plural execution contexts into corresponding independently-replayable execution traces. As shown, in addition to processor 102, computer system 101 also includes system memory 103 and durable storage 104, which are communicatively coupled to each other, and to the processor 102, using at least one communications bus 105.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (not shown), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, in embodiments the processor 102 includes a processing unit 106 (or a plurality of processing units), a memory cache 107 (or a plurality of memory caches), a translation lookaside buffer (TLB) 108 (or a plurality of TLBs), and control logic 109 (e.g., gate logic, executable microcode, etc.). Each processing unit 106 (e.g., processor core) loads and executes machine code instructions on at least one of a plurality of execution units 106b. During execution of these machine code instructions, the instructions can use registers 106a as temporary storage locations, and can read and write to various locations in system memory 103 via the memory cache 107. Each processing unit 106 executes machine code instructions that are defined by a processor instruction set architecture (ISA). The particular ISA of each processor 102 can vary based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, a machine code instruction is the smallest externally-visible (i.e., external to the processor) unit of code that is executable by a processor.

Registers 106a are hardware storage locations that are defined based on the ISA of the processor 102. In general, registers 106a are read from and/or written to by machine code instructions, or a processing unit 106, as those instructions execute at execution units 106b. Registers 106a are commonly used to store values fetched from the memory cache 107 for use as inputs to executing machine code instructions, to store the results of executing machine code instructions, to store a program instruction count, to support maintenance of a thread stack, etc. In some embodiments, registers 106a include "flags" that are used to signal some state change caused by executing machine code instructions (e.g., to indicate if an arithmetic operation cased a carry, a zero result, etc.). In some embodiments, registers 106a include one or more control registers (e.g., which are used to control different aspects of processor operation), and/or other processor model-specific registers (MSRs).

The memory cache 107 temporarily caches blocks of system memory 103 during execution of machine code instructions by processing unit 106. In some implementations, the memory cache 107 includes one or more "code" portions that cache portions of system memory 103 storing application code, as well as one or more "data" portions that cache portions of system memory 103 storing application runtime data. If a processing unit 106 requests data (e.g., code or application runtime data) not already stored in the memory cache 107, then the processing unit 106 initiates a "cache miss," causing one or more blocks of data to be fetched from system memory 103 and influxed into the memory cache 107—while potentially replacing and "evicting" some other data already stored in the memory cache 107 back to system memory 103.

Figure 2:
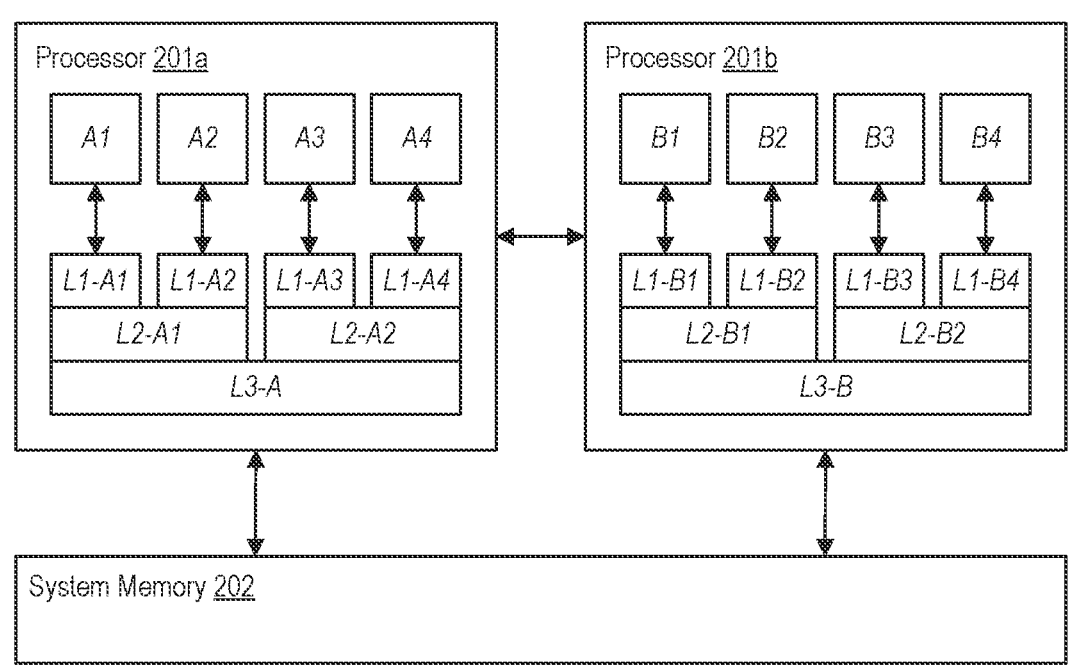
FIG. 2 illustrates an example environment demonstrating multi-level memory caches.

In the embodiments herein, the memory cache 107 comprises multiple cache levels (sometimes referred to cache tiers or cache layers)—such as a level 1 (L1) cache, a level 2 (L2) cache, a level 3 (L3) cache, etc. For example, FIG. 2 illustrates an example environment 200 demonstrating multi-level memory caches. In FIG. 2, the example environment 200 comprises processor 201a and processor 201b (e.g., each a processor 102 in FIG. 1A, and collectively referred to as processors 201) and a system memory 202 (e.g., system memory 103 of FIG. 1A). In the example environment 200, each of processors 201 comprises four processing units (e.g., each a processing unit 106 in FIG. 1A), including processing units A1-A4 for processor 201a and processing units B1-B4 for processor 201b.

In example environment 200, each of processors 201 also includes a three-level memory cache hierarchy. Environment 200 is one example memory cache layout only, and it is not limiting to the memory cache hierarchies in which the embodiments herein may operate. In environment 200, each processing unit includes its own dedicated L1 memory cache (e.g., L1 memory cache "L1-A1" in processor 201a for unit A1, L1 memory cache "L1-A2" in processor 201a for unit A2, etc.). Relative to the L1 memory caches, each of processors 201 also includes two upper-level L2 memory caches (e.g., L2 memory cache "L2-A1" in processor 201a that serves as a backing store for L1 memory caches L1-A1 and L1-A2, L2 memory cache "L1-A2" in processor 201a that serves as a backing store for L1 memory caches L1-A3 and L1-A4, etc.). Finally, relative to the L2 memory caches, each of processors 201 also includes a single L3 memory cache (e.g., L3 memory cache "L3-A" in processor 201*a* that serves as a backing store for L2 memory caches L2-A1 and L2-A2, and L3 memory cache "L3-B" in processor 201*b* that serves as a backing store for L2 memory caches L2-B1 and L2-B2).

As shown, system memory 202 serves as a backing store for the L3 memory caches L3-A and L3-B. In this arrangement, and depending on implementation, cache misses in an L1 memory cache might be served by its corresponding L2 memory cache, its corresponding L3 memory cache, and/or system memory 202; cache misses in an L2 memory cache might be served by its corresponding L3 memory cache and/or system memory 202; and cache misses in an L3 memory cache might be served by system memory 202.

In some environments, some memory cache levels exist separate from a processor; for instance, in environment 200 one or both of the L3 memory caches could alternatively exist separate from processors 201, and/or environment 200 could include one or more additional memory caches (e.g., L4, L5, etc.) that exist separate from processors 201.

As demonstrated by the arrows within each of processors 201, when multiple memory cache levels exist, each processing unit typically interacts directly with the lowest level (e.g., L1). In many implementations, data flows between the levels (e.g., an L3 memory cache interacts with the system memory 202 and serves data to an L2 memory cache, and the L2 memory cache in turn serves data to the L1 memory cache). However, as will be appreciated by one of ordinary skill in the art, the particular manner in which processing units interact with a memory cache, and the particular manner in which data flows between memory cache levels, may vary (e.g., depending on whether the memory cache is inclusive, exclusive, or some hybrid).

Given their arrangement, the memory caches in environment 200 may be viewed as "shared" memory caches. For example, each L2 and L3 memory cache serves multiple processing units within a given one of processors 201 and are thus shared by these processing units. The L1 memory caches within a given one of processors 201, collectively, can also be considered shared-even though each one corresponds to a single processing unit-because the individual L1 memory caches may coordinate with each other via a cache coherency protocol (CCP) to ensure consistency (i.e., so that each cached memory location is viewed consistently across all the L1 memory caches). The L2 memory caches within each of processors 201 similarly may coordinate via a CCP. Additionally, each individual L1 memory cache may be shared by two or more physical or logical processing units, such as where the processor supports hyper-threading, and are thus "shared" even at an individual level.

Figure 3:
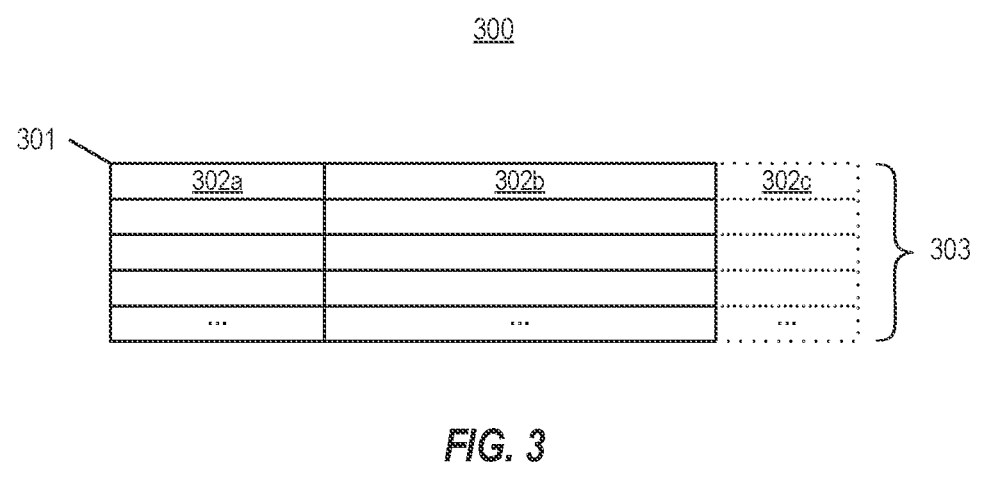

In embodiments, each level of the memory cache 107 comprises a plurality of slots 303 that store cache lines (also commonly referred to as cache blocks). Each cache line corresponds to a contiguous block of system memory 103. For example, FIG. 3 illustrates an example 300 of a memory cache 301 (e.g., an L1 memory cache, an L2 memory cache, etc.) that includes a plurality of slots 303. In example 300, each of slots 303 stores a plurality of portions 302, including at least an address portion 302*a* that stores a memory address, and a cache line portion 302*b* that stores cache line data corresponding to that memory address. During an influx to one of slots 303, the cache line portion 302*b* of the slot is generally filled with a block of data obtained from an upper-level memory cache, or from the system memory 103.

Depending on a size of the cache line portion 302*b*, each of slots 303 may potentially store data spanning a plurality of consecutive individually addressable locations within the system memory 103. The cache line portion 302*b* of each of slots 303 can be modified by processing unit 106, and eventually be evicted back to an upper-level memory cache, or to the system memory 103. As indicated by the ellipses within the memory cache 301, each memory cache can include a large number of slots. For example, a contemporary 64-bit INTEL processor may contain individual L1 memory caches for each processing unit 106 comprising 512 or more slots. In such a memory cache, each slot is typically used to store a 64-byte (512-bit) value in reference to a 6-byte (48-bit) to 8-byte (64-bit) memory address. As shown, memory caches are generally larger in size (i.e., more slots) as their level increases. For example, an L2 memory cache is generally larger than an L1 memory cache, an L3 memory cache is generally larger than an L2 memory cache, and so on.

As mentioned, memory caches coordinate using a CCP. In general, a CCP defines how consistency is maintained between various memory caches as various processing units read from and write data to those caches, and how to ensure that the processing units always read consistent data for a given cache line. CCPs are typically related to, and enable, a memory model defined by the processor's instruction set architecture (ISA). Examples of popular ISA's include the x86 and x86_64 families of architectures from INTEL, and the ARM architecture from ARM HOLDINGS. Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual cache line stored in a shared memory cache. A "modified" cache line contains data that has been modified in the shared memory cache and is therefore inconsistent with the corresponding data in the backing store (e.g., system memory 103 or another memory cache). When a cache line having the "modified" state is evicted from the shared memory cache, common CCPs require the cache to guarantee that its data is written back the backing store, or that another memory cache take over this responsibility. A "shared" cache line is not permitted to be modified and may exist in a shared or owned state in another memory cache. The shared memory cache can evict this data without writing it to the backing store. An "invalid" cache line contains no valid data and can be considered empty and usable to store data from cache miss. An "exclusive" cache line contains data that matches the backing store and is used by only a single processing unit. It may be changed to the "shared" state at any time (i.e., in response to a read request) or may be changed to the "modified" state when writing to it. An "owned" cache location contains data that that is inconsistent with the corresponding data in the backing store. When a processing unit makes changes to an owned cache location, it notifies the other processing units-since the notified processing units may need to invalidate or update based on the CCP implementation.

As shown, each slot in the memory cache 301 may include additional portions 302*c* (i.e., one or more additional portions). In some embodiments, one of additional portions 302*c* comprises one or more logging bits used to track whether a cache line stored in a corresponding one of slots 303 has been logged to a trace or not, as described infra. In some embodiments, one of additional portions 302*c* stores a tag that comprises one or more data fields for storing information relevant to its corresponding slot. In embodiments, the slots of at least one memory cache level comprises an additional portion for storing tags, and those embodiments use those tags to improve trace logging, as described infra.

In some situations, the address portion 302a of each of slots 303 stores a physical memory address, such as the actual corresponding memory address in the system memory 103. In other situations, the address portion 302a of each of slots 303 stores a virtual memory address. In embodiments, a virtual memory address is an address within a virtual address space that is exposed by an operating system to a process executing at the processor 102. This virtual address space provides one or more abstractions to the process, such as that the process has its own exclusive memory space and/or that the process has more memory available to it than actually exists within the system memory 103. Such abstractions can be used, for example, to facilitate memory isolation between different processes executing at the processor 102, including isolation between user-mode processes and kernel-mode processes.

In embodiments, virtual to physical memory address mappings are maintained within one or more memory page tables that are stored in the system memory 103, and that are managed by an operating system and/or hypervisor (e.g., operating environment 110, described infra). In general, these memory page tables comprise a plurality of page table entries (PTEs) that map ranges (i.e., pages) of virtual memory addresses to ranges (i.e., pages) of physical memory addresses. In embodiments, each PTE stores additional attributes, or flags, about its corresponding memory pages, such as memory page permissions (e.g., read-only, writeable, etc.), page state (e.g., dirty, clean, etc.), and the like. In some implementations, PTEs are part of a multi-level hierarchy, which includes one or more page directory entries (PDEs) that support discovery of individual PTEs.

In embodiments, the TLB 108 facilitates virtual addressing, and is a dedicated form of cache that stores recently obtained PTEs mapping virtual and physical memory pages, as obtained from the memory page tables stored in the system memory 103. In general, when a processing unit 106 accesses a virtual memory address, the processor 102 determines if a physical mapping can be determined from a PTE stored in the TLB 108. If not, the processor 102 performs a "page table walk" of one or more memory page tables stored in system memory 103, in order to identify a relevant mapping between a virtual memory page containing the virtual memory address and a physical memory page containing a corresponding physical memory address. The processor 102 then stores this mapping as an entry within a slot of the TLB 108. In some embodiments, TLB 108 comprises multiple levels, similar to the memory cache 107.

In embodiments, control logic 109 comprises microcode (i.e., executable instructions) and/or physical logic gates that control operation of the processor 102. In general, control logic 109 functions as an interpreter between the hardware of the processor 102 and the processor ISA exposed by the processor 102 to executing applications (e.g., operating environment 110, application 111, etc.) and controls internal operation of the processor 102. In embodiments, the control logic 109 is embodied on on-processor storage, such as ROM, EEPROM, etc. In some embodiments, this on-processor storage is writable (in which case the control logic 109 is updatable), while in other embodiments this on-processor storage is read-only (in which case the control logic 109 cannot be updated).

The durable storage 104 stores computer-executable instructions and/or data structures representing executable software components. Correspondingly, during execution of these software components at the processor 102, one or more portions of these computer-executable instructions and/or data structures are loaded into system memory 103. For example, the durable storage 104 is illustrated as storing computer-executable instructions and/or data structures corresponding to an operating environment 110 and an application 111 (or a plurality of applications). Correspondingly, the system memory 103 is shown as storing an operating environment runtime 110' (e.g., machine code instructions and/or runtime data supporting execution of operating environment 110), and as storing at least one application runtime 111' (e.g., machine code instructions and/or runtime data supporting execution of application 111). The system memory 103 and durable storage 104 can also store other data, such a replayable execution trace 112 (i.e., replayable execution trace 112' stored in system memory 103 and/or replayable execution trace 112 stored in durable storage 104) and a data structure 113 (or a plurality of data structures) that facilitates communication between operating environment 110 and control logic 109 during tracing of application 111.

In FIG. 1A, operating environment 110 is shown as potentially including a hypervisor 110a, and as including an operating system 110b (or a plurality of operating systems). Correspondingly, the operating environment runtime 110' is shown as potentially including a hypervisor runtime 110a', and as including an operating system runtime 110b'.

For example, in some embodiments, the operating environment 110 comprises the hypervisor 110a executing directly on the hardware (e.g., processor 102, system memory 103, and durable storage 104) of computer system 101, and operating system 110b executing on top of the hypervisor 110a. In other embodiments, however, the operating environment 110 comprises an operating system 110b executing directly on the hardware (e.g., processor 102, system memory 103, and durable storage 104) of computer system 101.

In embodiments, the operating environment 110 and the control logic 109 cooperate to record a replayable execution trace 112 (or a plurality of replayable execution traces) of code execution at the processor 102. In embodiments, tracing techniques utilized by the operating environment 110 and control logic 109 to record a replayable execution trace 112 are based at least on the processor 102 recording influxes to at least a portion of the memory cache 107 during code execution. In embodiments, each replayable execution trace 112 comprises a "bit-accurate" record of execution of a corresponding execution context (e.g., thread, process, operating system, virtual machine, enclave, hypervisor, etc.) as that execution context executed at the processor 102. In some embodiments, a replayable execution trace is a "bit accurate" record of that execution context's execution activity. This bit-accurate record enables machine code instructions that were previously executed as part of the execution context at the processing unit 106 to be replayed later, such that, during replay, these machine code instructions are re-executed in the same order and consume the same data that they did during trace recording. While a variety of bit-accurate tracing approaches are possible, as mentioned, the embodiments herein record a bit-accurate execution trace based on logging at least some of the influxes to memory cache 107 during execution of a traced execution context (e.g., thread process, virtual machine, etc.). By logging at least some of these influxes during execution of the execution context, a replayable execution trace 112 of that execution context captures at least some of the memory reads that were performed by the machine code instructions that executed as part of the execution context.

The cache-based tracing techniques used by the embodiments herein are built upon an observation that the processor 102 (including its the memory cache 107) forms a semi—or quasi-closed system. For example, once portions of data for an execution context (i.e., machine code instructions and runtime data) are loaded into memory cache 107, processing unit 106 can continue executing that execution context-without any other external input—as a semi- or quasi-closed system for bursts of time. In particular, once the memory cache 107 is loaded with machine code instructions and runtime data, the execution units 106b can load and execute those machine code instructions from the memory cache 107, using runtime data stored in the memory cache 107 as input to those machine code instructions, and using the registers 106a. So long as the data (i.e., machine code instructions and runtime data) that are needed for the processor 102 to execute that thread exists within the memory cache 107, the processor 102 can continue executing that execution context without further external input.

When the processing unit 106 needs some influx of data (e.g., because a machine code instruction it is executing, will execute, or may execute accesses code or runtime data not already in the memory cache 107), the processor 102 may carry out a "cache miss," importing data into the memory cache 107 from the system memory 103. As part of this process, the processor 102 may also refer to a PTE stored in the TLB 108, or perform a page walk of one or more memory page tables stored in system memory 103 and influx a PTE into the TLB 108. In an example, if a data cache miss occurs when a processing unit 106 executes a machine code instruction that performs a memory operation on a memory address within the operating environment runtime 110' storing runtime data, the processor 102 imports runtime data from that memory address in the system memory 103 to one of the cache lines of the data portion of the memory cache 107. Similarly, if a code cache miss occurs when a processing unit 106 tries to fetch a machine code instruction from a memory address within the operating environment runtime 110' storing code, the processor 102 imports code from that memory address in system memory 103 to one of the cache lines of the code portion of the memory cache 107. The processing unit 106 then continues execution using the newly imported data, until new data is needed.

In embodiments, processor 102 is enabled to record a bit-accurate representation of execution of an execution context executing at the processor 102, by recording, into at least one trace data stream corresponding to the execution context, sufficient data to be able to reproduce at least a subset of influxes of information into the memory cache 107 and the TLB 108 as processing unit 106 executes that execution context's code. For example, some approaches to recording these influxes operate on a per-processing-unit basis. These approaches involve recording, for each processing unit that is being traced, at least a subset of cache misses within the memory cache 107, and at least a subset of PTE misses within the TLB 108, along with a time during execution at which each piece of data was brought into the memory cache 107 or the TLB 108 (e.g., using a count of instructions executed or some other counter). In some embodiments, these approaches involve also recording, for each processing unit that is being traced, any un-cached reads (i.e., reads from hardware components and un-cacheable memory that bypass the memory cache 107) caused by that processing unit's activity, as well as the side-effects of having executed any non-deterministic processor instructions (e.g., one or more values of registers 106a after having executed a non-deterministic processor instruction).

Figure 4:
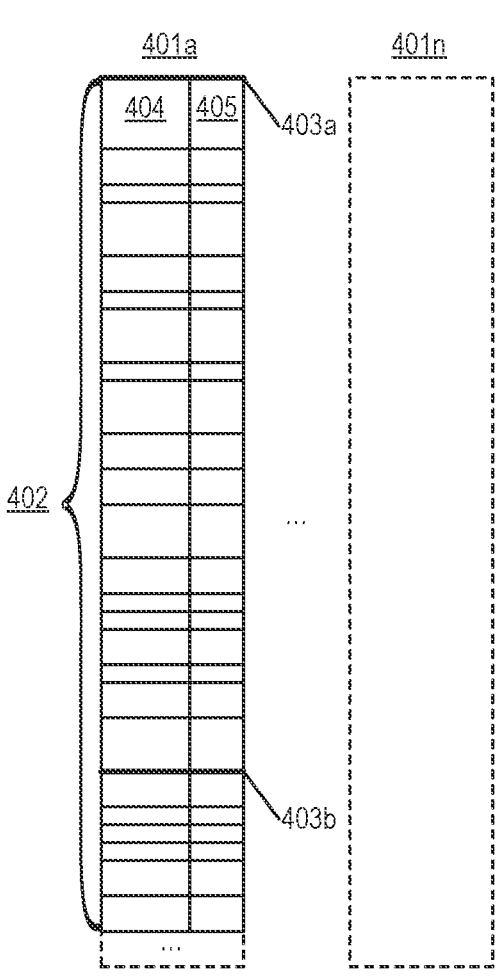
FIG. 4 illustrates an example of an execution trace.

FIG. 4 illustrates an example of an execution trace (e.g., replayable execution trace 112). In particular, FIG. 4 illustrates an execution trace 400 that includes a plurality of data streams 401 (i.e., data streams 401a-401n). In embodiments, each of data streams 401 represents execution of a different execution context, such as a different thread that executed from the code of operating environment 110 or application 111. In an example, data stream 401a records execution of a first thread of application 111, while data stream 401n records an nth thread of application 111. As shown, data stream 401a comprises a plurality of data packets 402. Since the particular data logged in each of data packets 402 can vary, these data packets are shown as having varying sizes. In embodiments, when using time-travel debugging technologies, one or more of data packets 402 records the inputs (e.g., register values, memory values, etc.) to one or more executable instructions that executed as part of this first thread of application 111. In embodiments, memory values are obtained as influxes to memory cache 107 and/or as uncached reads. In embodiments, data stream 401a also includes one or more key frames 403 (e.g., key frames 403a and 403b), each capturing sufficient information (e.g., such as a snapshot of register and/or memory values) to enable the prior execution of the thread to be replayed-starting at the point of the key frame and proceeding forward.

In embodiments, an execution trace also includes the actual code that was executed. Thus, in FIG. 4, each of data packets 402 is shown as including a data inputs portion 404 (non-shaded) and a code portion 405 (shaded). In embodiments, the code portion 405 of each of data packets 402, if present, includes the executable instructions that executed based on the corresponding data inputs. In other embodiments, however, an execution trace omits the actual code that was executed, instead relying on having separate access to the executable code (e.g., a copy of application 111). In these other embodiments, each data packet specifies an address or offset to an appropriate executable instruction in an application binary image. Although not shown, it is possible that the execution trace 400 includes a data stream that stores one or more of the outputs of code execution. It is noted that used of different data input and code portions of a data packet is for illustrative purposes only, and that the same data could be stored in a variety of manners, such as by the use of multiple data packets.

If there are multiple data streams, in embodiments these data streams include sequencing events. Each sequencing event records the occurrence of an event that is orderable across different execution contexts, such as threads. In one example, sequencing events correspond to interactions between the threads, such as accesses to memory that is shared by the threads. Thus, for instance, if a first thread that is traced into a first data stream (e.g., data stream 401a) writes to a synchronization variable, a first sequencing event is recorded into that data stream (e.g., data stream 401a). Later, if a second thread that is traced into a second data stream (e.g., data stream 401b) reads from that synchronization variable, a second sequencing event is recorded into that data stream (e.g., data stream 401b). These sequencing events are inherently ordered. For example, in some embodiments each sequencing event is associated with a monotonically incrementing value, with the monotonically incrementing values defining a total order among the sequencing events. In one example, a first sequencing event recorded into a first data stream is given a value of one, a second sequencing event recorded into a second data stream is given a value of two, etc.

Some bit-accurate tracing approaches leverage extensions to memory cache 107 that track whether the value of a given cache line can be considered to have been captured by a replayable execution trace 112 on behalf of processing unit 106. In various implementations, these cache modifications extend the slots (e.g., slots 303) in at least one level of the memory cache 107 to include additional "logging" (or "tracking") bits (e.g., using one of additional portions 302*c*), or reserve one or more slots for logging bit use. These logging bits enable the control logic 109 to identify, for each cache line, a processing unit 106 (or a plurality of processing units) that consumed/logged the cache line. Use of logging bits can enable the control logic 109 to avoid re-logging cache line influxes for one execution context after a processing unit transitions to another execution context (e.g., another thread, another virtual machine, kernel mode, etc.) if that other execution context did not modify the cache line. Additionally, use of logging bits can enable a trace entry for one execution context to reference data already logged on behalf of another execution context. In various embodiments, for each cache line, one or more logging bits are used as (i) a single flag that indicates whether or not the cache line has been logged on behalf of any processing unit, (ii) a plurality of flags that each indicate whether or not the cache line has been logged on behalf of a corresponding processing unit, or (iii) an index which indicates a particular processing unit from among a plurality of processing units for which the cache line has been logged (or which indicates that the cache line has not been logged on behalf of any processing unit using some non-index value).

Additional, or alternative, bit-accurate tracing approaches utilize associative memory caches, coupled with memory cache way-locking features to "lock" a subset of a memory cache to an execution context (or execution contexts) that is (or are) being traced, and then log based generally on identifying cache misses into this locked subset of the memory cache. In particular, these approaches utilize way-locking to lock one or more cache "ways" for the execution context(s) that is/are being traced, such that those way(s) are reserved for the traced execution context(s). Then, when fulfilling cache misses relating to execution of a traced execution context, those cache misses are influxed into cache slots corresponding to those locked ways. The control logic 109 then logs into an execution trace buffer based on which way a given cache miss is influxed into—e.g., by logging cache misses by any execution context into way(s) that are locked to traced execution context(s), by logging writes to locked ways by non-traced execution contexts, and by logging reads by the traced execution context(s) from way(s) that are not locked.

Figure 5:
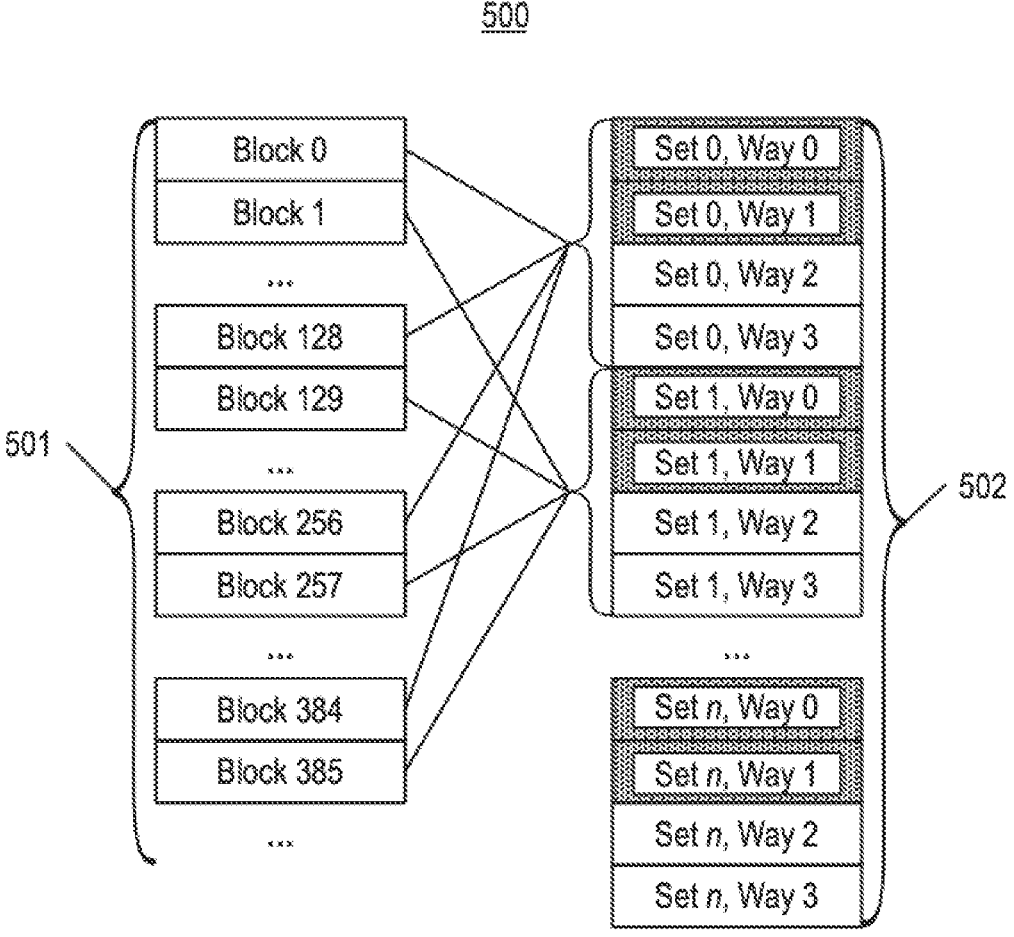
FIG. 5 illustrates an example of a set-associative cache mapping, where different locations in system memory are influxed to a corresponding set in a memory cache.

To illustrate, FIG. 5 shows an example 500 of a set-associative cache mapping, where different locations in system memory are influxed to a corresponding set in a memory cache. In example 500, a system memory 501 is shown as having a plurality of blocks (i.e., block 0, block 1, and so on), and a memory cache 502 that is organized into different sets (i.e., set 0, set 1, and so on to set n), each having four ways (i.e., way 0, way 1, way 3, and way 4). As shown, each block of system memory 501 maps to a corresponding set in the memory cache 502 (based on memory address); in general, that block can be stored in any way within the set. Set-associative caches are generally referred to as being k-way, where k is the number of ways in each set. Thus, memory cache 502 would be referred to as a 4-way set-associative cache.

As mentioned, when using way-locking as part of bit-accurate tracing, embodiments lock or reserve a set of cache ways to the execution context (or execution contexts) that is (or are) being traced-such that the locked ways are used exclusively for storing cache misses relating to memory blocks that map to memory space(s) of traced execution context(s). Thus, referring to example 500, way 0 and way 1 within each set are each illustrated as being shaded, indicating that those ways are locked to a traced execution context. When influxing a memory block from system memory 501 to memory cache 502, that block is therefore influxed to a slot within one of way 0 or way 1 if that memory block corresponds to the traced execution context, and otherwise the block is influxed to a slot within one of way 2 or way 4. With this configuration, memory activity for the traced execution context can be logged based on logging influxes to way 0 or way 1 (whether those influxes were caused by execution of the traced execution context, or not), based on logging writes to way 0 or way 1 by other execution contexts, and based on logging any reads by the traced execution context to way 2 and way 3 (e.g., reads by the traced execution context from shared memory).

Additional, or alternative, bit-accurate tracing approaches use memory markings as logging cues. More particularly, in embodiments, the operating environment 110 and the control logic 109 cooperate to record a replayable execution trace 112 based on categorizing different memory regions, such as physical memory pages in system memory 103, as logged (i.e., to be logged when consumed) or not logged (i.e., not to be logged when consumed). In embodiments, using memory markings as logging cues for processor-based execution tracing is based at least on (i) the operating environment 110 maintaining a data structure (e.g., data structure 113) that categorizes different memory regions as being logged and not logged, and (ii) the control logic 109 using this data structure to make logging decisions during code execution. For example, using the categorizations stored in data structure 113, if any execution context causes an influx of a cache line sourced from a memory region categorized/marked as logged, then the control logic 109 logs this influx into the replayable execution trace 112. In embodiments, memory markings are stored as part of PTEs and/or page directory entries (PDEs) within memory page tables, and those markings are therefore readily accessible to the processing unit 106 as part of cached PTEs/PDEs within the TLB 108. In other embodiments, the memory markings are stored as part of one or more bitmaps (e.g., pointed to by one of registers 106*a*), with one or more bits used to indicate whether or not the memory addresses within one or more corresponding memory regions are categorized as logged or not logged.

Figure 6:
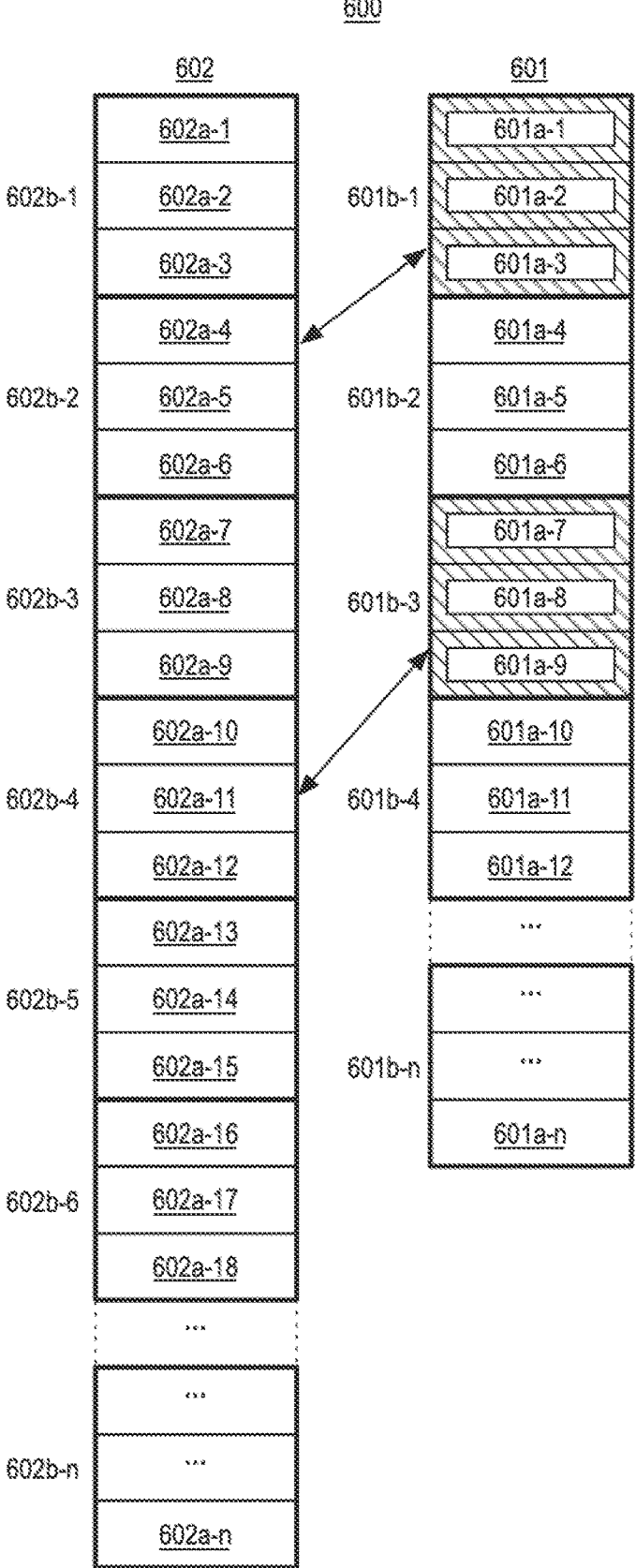
FIG. 6 illustrates an example of physical to virtual memory address space mappings, including use of memory markings as logging cues.

To illustrate, FIG. 6 shows an example 600 of physical to virtual memory address space mappings, including use of memory markings as logging cues. In particular, example 600 illustrates a physical address space 601 (e.g., corresponding to physical addresses in system memory 103) and a virtual address space 602 (e.g., corresponding to some execution context). Each address space is shown as including a plurality of addressable memory locations (i.e., physical memory location 601*a*-1 to physical memory location 601*a-n* for physical address space 601 and virtual memory location 602*a*-1 to virtual memory location 602*a-n* for virtual address space 602. In addition, in each address space, these addressable memory locations are shown as being arranged into different memory pages (i.e., physical memory page 601*b*-1 to physical memory page 601*b*-*n* for physical address space 601 and virtual memory page 602*b*-1 to virtual memory page 602*b*-*n* for virtual address space 602). As indicated by an arrow between physical memory page 601*b*-1 in physical address space 601 and virtual memory page 602*b*-2 in virtual address space 602, there is a first region of physical address space 601 (i.e., physical memory location 601*a*-1 to physical memory location 601*a*-3) that maps to a first region of virtual address space 602 (i.e., virtual memory location 602*a*-4 to virtual memory location 602*a*-6). In addition, as indicated by an arrow between physical memory page 601*b*-3 in physical address space 601 and virtual memory page 602*b*-4 in virtual address space 602, there is also a second region of physical address space 601 (i.e., physical memory location 601*a*-7 to physical memory location 601*a*-9) that maps to a second region of virtual address space 602 (i.e., virtual memory location 602*a*-10 to virtual memory location 602*a*-12).

In example 600, physical memory page 601*b*-1 and physical memory page 601*b*-3 are shaded (i.e., with left-slanted diagonal lines), indicating that those memory pages are marked as being logged. Thus, during execution of code by the processor 102, the control logic ensures that accesses (e.g., by a traced execution context) to virtual memory page 602*b*-2 (physical memory page 601*b*-1) and virtual memory page 602*b*-4 (physical memory page 601*b*-3) are appropriately logged to a replayable execution trace 112. The other physical memory pages are shown without any shading, indicating they are marked as being not logged, and accesses to those memory pages are not logged. In various embodiments, a marking as being not logged is a default state (e.g., absence of a marking), or is affirmatively set.

Additional, or alternative, bit-accurate tracing approaches reduce the size of replayable execution traces by performing cache-based trace logging using tags in a higher memory level (e.g., an upper-level cache, or system memory 103). These upper-level cache tagging approaches operate to log influxes to a first cache level, but leverage tags within an upper second cache level (or even within system memory 103) to track whether a value of a given cache line influx has already been captured by a replayable execution trace 112. In particular, during an influx of a cache line to the first cache level, embodiments consult a tag in the second cache level (or system memory 103) to determine if a current value of the cache line can be reconstructed from prior trace logging, such as trace logging performed in connection with a prior influx of the cache line to the first cache level. If so, embodiments refrain from capturing a current value of the cache line into the replayable execution trace 112 when the cache line is influxed to the first cache level. Additionally, during evictions from the first cache level, embodiments determine whether the cache line being evicted is in a "logged state" within the first cache level (i.e., a current value of the cache line can be obtained from a prior-recorded trace, and/or can be constructed by replaying the prior-recorded trace) and sets a tag in the second cache level (e.g., a tag stored in one of additional portions 302*c*) as appropriate to indicate whether or not the cache line that is being evicted is logged.

Regardless of which tracking technique (or techniques) is (or are) used, in embodiments the control logic 109 logs based on influxes at a particular level in a multi-level memory cache (i.e., a "recording" or "logging" cache level). For example, in embodiments the control logic 109 logs influxes at an L2 memory cache level, even if one or more higher cache levels are present. Thus, in this example, the L2 memory cache level is referred to as a recording cache level.

At least some embodiments described herein extend one or more of these bit-accurate tracing approaches with processor support for recording simultaneous/interleaved execution of plural execution contexts into corresponding independently-replayable execution traces. In general, these embodiments operate to record memory effects caused by execution of a given traced execution context into its own execution trace using one or more of the tracing techniques already discussed (e.g., way-locking, page marking, etc.). Additionally, in order to capture the effects on cache data usable by a given traced execution context that are caused by execution of other execution context(s), these embodiments track whether a memory operation that is caused by execution of a given execution context (whether that execution context is being traced or not) either (i) influxes memory data into a cache, or (ii) modifies already cached memory data, where the memory data is associated with any other execution context whose execution is being traced. When an execution context's execution does cause a memory operation that influxes or modifies memory data associated with another execution context whose execution is being traced, these embodiments log the effects of the memory operation into a dedicated execution trace corresponding to the appropriate traced execution context. When performing the foregoing for each of a plurality of execution contexts that are being recorded into independent and separate execution traces, each recorded execution trace stores sufficient data to reproduce the cache state needed to support replay of all memory operations that were actually performed by that execution trace's corresponding execution context.

In some embodiments, processor support for using way-locking for bit-accurate tracing is extended to support recording simultaneous/interleaved execution of plural execution contexts into corresponding independently-replayable execution traces. As discussed, using way-locking for bit-accurate tracing generally operates to log cache misses into a reserved subset of way(s) that are locked to traced execution context(s), to log writes to this reserved subset by non-traced execution contexts, and to log reads by a traced execution context from way(s) that are not locked. The embodiments herein extend these techniques by reserving a different subset of one or more locked ways for each of a plurality of traced execution contexts, with each traced execution context being assigned to a different execution trace buffer. Then, when any execution context other than a particular execution context to which a particular subset of ways is reserved causes an influx or a write into that particular subset of ways, the embodiments herein log the influx/write into the particular execution context's assigned execution trace. When combined with other cache way-locking tracing techniques that record memory operations caused by execution of each traced execution context, itself, these embodiments enable each execution trace to contain memory data sufficient to replay memory operations of the execution trace's corresponding traced execution context.

FIG. 1B illustrates additional detail of control logic 109*a*, including components that operate to use cache way-locking to simultaneously record plural execution contexts into independent execution traces. The depicted components of control logic 109*a*, together with any sub-components, represent various functions that the control logic 109*a* might implement or utilize in accordance with various embodiments described herein. It will be appreciated, however, that the depicted components-including their identity, sub-components, and arrangement—are presented merely as an aid in describing various embodiments of the control logic 109*a* described herein, and that these components are non-limiting to how software and/or hardware might implement various embodiments of the control logic 109a described herein, or of the particular functionality thereof.

As shown, the control logic 109a comprises cache way-locking logic 114. In general, the cache way-locking logic 114 operates to use way-locking to partition a memory cache 107 into a plurality of subsets, at least two of which are locked to (and reserved for) corresponding traced execution contexts-such as based on one or more of an address space identifier (ASID) or a ring associated with each traced execution context. In addition, the cache way-locking logic 114 influxes cache lines corresponding to memory addresses within a traced execution context's memory space into that execution context's reserved subset of way(s), and influxes cache lines corresponding to memory addresses within each non-traced execution context's memory space into an unreserved subset of way(s).

Figure 7:
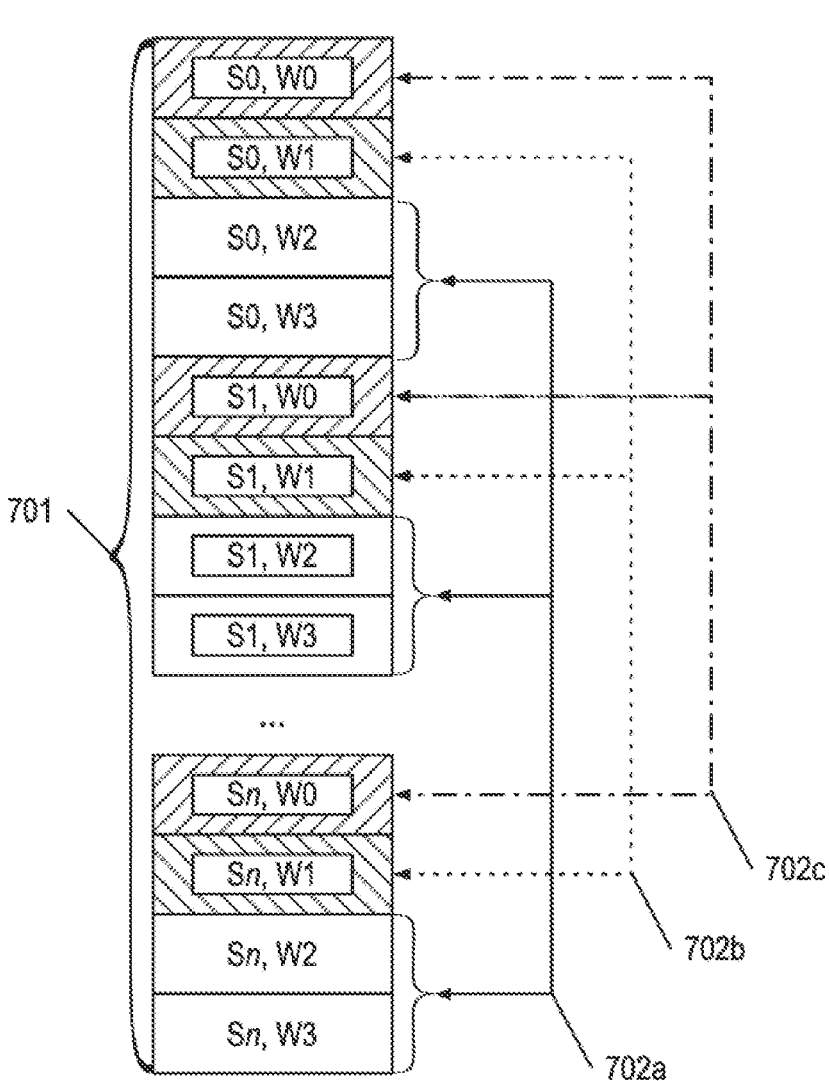
FIG. 7 illustrates an example of reserving separate subsets of memory cache ways for different traced execution contexts.

For example, FIG. 7 illustrates an example 700 of reserving separate subsets of memory cache ways for different traced execution contexts. As illustrated, example 700 shows a memory cache 701 (e.g., at least one level of memory cache 107) that is organized into different sets (i.e., set 0, set 1, and so on to set n), each having four ways (i.e., way 0, way 1, way 3, and way 4). In example 700, way 0 within each set is shaded with right-slanted diagonal lines, indicating that those ways are locked by the cache way-locking logic 114 to a first traced execution context (e.g., context A) having its own first execution trace buffer; as illustrated by dash-dotted arrows, these ways form a memory cache subset 702c reserved for the first traced execution context. Additionally, way 1 within each set is shaded with left-slanted diagonal lines, indicating that those ways are locked by the cache way-locking logic 114 to a second traced execution context (e.g., context B) having its own second execution trace buffer; as illustrated by dotted arrows, these ways form a memory cache subset 702b reserved for the second traced execution context. Finally, way 2 and way 3 within each set is not shaded, indicating that those ways are not locked by the cache way-locking logic 114 to any execution context; as illustrated by solid arrows, these ways form a memory cache subset 702a that is not reserved for any traced execution context (i.e., one or more unrecorded contexts).

The control logic 109a also comprises memory operation detection logic 115. In general, the memory operation detection logic 115 detects when an execution context has requested a memory operation that affects the memory cache 701. In addition, the memory operation detection logic 115 identifies a type of the memory operation (e.g., read or write), whether the memory operation caused an influx into the memory cache 701, and which subset of way(s) in the memory cache 701 were affected. In addition, the memory operation detection logic 115 identifies which execution context requested the memory operation.

The control logic 109a also comprises logging logic 116. In general, the logging logic 116 uses a combination of (i) which execution context requested a memory operation, (ii) which subset of the memory cache 701 was affected by the memory operation, and (iii) a result of the memory operation (e.g., one or more of influx, read, or write) to determine whether to log the memory operation (i.e., using logging action determination logic 117), and if so to which trace buffer (i.e., using logging buffer determination logic 118). When the logging action determination logic 117 determines that a memory operation should be logged, logging initiation logic 119 initiates that logging to the chosen trace buffer.

Example operation of the logging logic 116 is now described in connection with FIG. 9, which illustrates an example matrix 900 of logging actions for using way-locking to record simultaneous execution of plural execution contexts into independently-replayable execution traces. As indicated in cell 901a, cell 901b, and cell 901c, matrix 900 includes a row for each of: recorded context A, recorded context B, and unrecorded context(s). As indicated in cell 902a, cell 902b, and cell 902c, matrix 900 includes a column for each of: recorded context A's reserved subset of ways (e.g., memory cache subset 702c), recorded context B's reserved subset of ways (e.g., memory cache subset 702b), and an unreserved subset of ways (e.g., memory cache subset 702a). Each cell at an intersection of a corresponding row and a corresponding column indicates a logging action (or inaction) taken when the corresponding row's context performs a memory operation on the corresponding column's subset of ways. While matrix 900 only shows two recorded contexts, the principles described herein can be applied to any number of recorded contexts.

Based on execution of each recorded execution context, the logging logic 116 logs, into that recorded execution context's execution trace, memory operations that cause influxes into that execution context's set of reserved way(s), or that are reads from any other set of ways. This enables those influxes and reads to be reproduced from that recorded execution context's execution trace. For example, as shown in matrix 900, when recorded context A causes an influx into its own reserved way(s), the logging logic 116 logs that influx into context A's execution trace (i.e., cell 903, Influx); and when recorded context A reads from any other set of way(s) the logging logic 116 logs that read into context A's execution trace (i.e., cell 904 and cell 905, Read). Similarly, when recorded context B causes an influx into its own reserved way(s), the logging logic 116 logs that influx into context B's execution trace (i.e., cell 907, Influx); and when recorded context B reads from any other set of way(s) the logging logic 116 logs that read into context B's execution trace (i.e., cell 906 and cell 908, Read).

The logging logic 116 also logs, into a particular recorded execution context's execution trace, memory operations by other than the particular recorded execution context that cause influxes into the particular execution context's set of reserved way(s). Since the particular recorded execution context could later do a read from the influxed data without causing an influx itself, this enables those influxes to be reproduced from the particular recorded execution context's execution trace when replaying a read memory operation on behalf of the particular recorded execution context. For example, as shown in matrix 900, when recorded context A causes an influx into recorded context B's way(s), the logging logic 116 logs that influx into context B's execution trace (i.e., cell 904, Influx); when recorded context B causes an influx into recorded context A's way(s), the logging logic 116 logs that influx into context A's execution trace (i.e., cell 906, Influx); when an unrecorded context causes an influx into recorded context A's way(s), the logging logic 116 logs that influx into context A's execution trace (i.e., cell 909, Influx); and when an unrecorded context causes an influx into recorded context B's way(s), the logging logic 116 logs that influx into context B's execution trace (i.e., cell 910, Influx).

For memory operations by other than a particular recorded execution context that write into the particular execution context's set of reserved way(s), in some embodiments the logging logic 116 logs the write into the particular recorded execution context's execution trace. Since the particular recorded execution context could later perform a read from the written data, this logging enables those writes to be reproduced from the particular recorded execution context's execution trace. In other embodiments, the logging logic 116 causes an eviction of any cache line that was the subject of the write. By doing an eviction, an influx would later be logged into the particular recorded execution context's trace if the particular recorded execution context were to subsequently access the written—to cache line. For example, as shown in matrix 900, when recorded context A performs a write into context B's way(s), the logging logic 116 logs that write into context B's execution trace, or evicts the written—to cache line (i.e., cell 904, Write); when recorded context B performs a write into context A's way(s), the logging logic 116 logs that write into context A's execution trace, or evicts the written—to cache line (i.e., cell 906, Write); when an unrecorded context performs a write into context A's way(s), the logging logic 116 logs that influx into context A's execution trace, or evicts the written—to cache line (i.e., cell 909, Write); and when an unrecorded context performs a write into context B's way(s), the logging logic 116 logs that influx into context B's execution trace, or evicts the written—to cache line (i.e., cell 910, Write). In yet other embodiments, the logging logic 116 signals the cache line as being not logged by moving the cache line out of the logged way it is in into a way that is not logged, or by marking the entire way the cache line is in as not logged going forward.

Notably, it is possible that a single memory operation could cause multiple logging actions. For example, referring to cell 904, a read by context A from context B's way(s) could cause an influx to context B's way(s); in this case, the logging logic 116 may log the influx into context B's execution trace, and may also log the read into context A's execution trace. Similarly, referring again to cell 904, a write by context A into context B's way(s) could cause an influx to context B's way(s); in this case, the logging logic 116 may log the influx into context B's execution trace, and may either log the read into context B's execution trace or evict the written—to cache line. Similar multiple logging actions could result from a memory operation by context B into context A's way(s) (i.e., cell 906).

Several cells have "no logging" actions (i.e., cell 903, Read/Write; cell 905, Influx/Write; cell 907, Read/Write; cell 909, Read; cell 910, Read; and cell 911). In some embodiments one or more of these no logging actions could be logging actions; however, it will be appreciated by one of ordinary skill in the art that the logging actions already described are sufficient to reproduce memory operations by the recorded contexts.

In order to further describe operation of these components of control logic 109a, the following discussion now refers to a method and method acts. Although the method acts may be discussed in certain orders, or may be illustrated in a flow chart as occurring in a particular order, no particular ordering is required unless specifically stated, or required because an act is dependent on another act being completed prior to the act being performed.

FIG. 11 illustrates a flow chart of an example method 1100 for using cache way-locking to simultaneously record plural execution contexts into independent execution traces. Method 1100 will be described with respect to the components and data of computing environment 100. In embodiments, method 1100 is implemented based on control logic (e.g., control logic 109a) of a processor (e.g., processor 102) that comprises a processing unit (e.g., processing unit 106) and a memory cache (e.g., memory cache 107).

Method 1100 comprises an act 1101 of partitioning a memory cache into a plurality of subsets, including locking a first set of ways to a first execution context, and locking a second set of ways to a second execution context. In an example of act 1101, the cache way-locking logic 114 partitions memory cache 701 into memory cache subset 702c reserved for a first traced execution context (recorded context A), and memory cache subset 702b reserved for a second traced execution context (recorded context B). In embodiments, this leaves memory cache subset 702a that is unreserved. In embodiments, act 1101 has a technical effect of enabling cache influxes to be routed an appropriate subset of the cache, based on a memory address space from which the influx is sourced. Additionally, act 1101 has a further technical effect of being able to use cache ways in order to differentiate cache lines that are applicable to each of two or more traced execution contexts.

Method 1100 also comprises an act 1102 of executing an execution context at a processor. In an example of act 1102, the processor 102 executes a thread from code of operating environment 110 or an application 111. In FIG. 11, act 1102 can comprise executing a logged first execution context at the processor (act 1102a), executing a logged second execution context at the processor (act 1102b), or executing a non-logged third execution context at the processor (act 1102c). In embodiments, act 1102 has a technical effect of executing code that can perform a memory operation, thereby triggering act 1103.

Method 1100 also comprises an act 1103 of detecting a memory operation by the execution context into the memory cache. In an example of act 1103, the memory operation detection logic 115 detects that execution of the execution context in act 1102 has resulted in a memory operation, which affects one or more slots in memory cache 701. The memory operation detection logic 115 can also identify result(s) of the memory operation (e.g., read, write, influx), which subset of memory cache 701 was affected, and which execution context caused the memory operation. In embodiments, act 1103 has a technical effect of detecting a modification to the memory cache 701 that may potentially need to be logged into an execution trace.

Method 1100 also comprises an act 1104 of, based on an identity of the execution context, an identity of a target memory cache subset, and an operation result, determining: (i) whether to log the memory operation and, when logging, and (ii) a destination trace buffer. In an example of act 1104, the logging action determination logic 117 uses an identity of the execution context, an identity of a target memory cache subset, and an operation result (e.g., influx, read, write) to determine whether or not to perform one or more logging actions, and if so, what those action(s) are (e.g., log influx, log read, log write, evict). In embodiments, the logging action determination logic 117 follows matrix 900 to determine the logging action(s). When the logging action determination logic 117 determines that one or more logging actions should be performed, the logging buffer determination logic 118 determines to which execution trace buffer (if any) each logging action should be targeted. In embodiments, the logging buffer determination logic 118 follows matrix 900 to determine the applicable execution trace buffer(s), if any.

In some situations, method 1100 also comprises an act 1105 of logging one or more of an influx, a read, or a write to the destination trace buffer, or evicting a cache line. In an example of act 1105, when the logging action determination logic 117 has determined that one or more of a "log influx," a "log read," or a "log write," action is to be performed, the logging initiation logic 119 initiates that logging action to the execution trace buffer(s) identified by the logging buffer determination logic 118. In another example of act 1105, when the logging action determination logic 117 has determined that an eviction action is to be performed, the control logic 109a evicts a target cache line from the memory cache 701. Notably, act 1105 is shown in broken lines to indicate that act 1105 may not always be performed—for example, when the logging action determination logic 117 determines in act 1104 that no logging action is to be performed.

In embodiments, act 1104 and act 1105 have a technical effect of either (i) committing trace data to at least one replayable execution trace 112 that is usable to replay an executable context, or (ii) clearing a cache line from the memory cache 701. In embodiments, clearing a cache line from the memory cache 701 enables that cache line to be logged as an influx later, if it is later accessed by a recorded execution context.

As shown, there is an arrow extending from act 1105 to act 1102, indicating that act 1102 to act 1105 can repeat any number of times, with any of act 1102a, act 1102b, or act 1102c occurring in connection with each instance of act 1102.

In one example application of method 1100, some embodiments are directed to methods, systems, and computer program products for using cache way-locking to simultaneously record plural execution contexts into independent execution traces. In an embodiment, a microprocessor (e.g., processor 102) comprises a processing unit (e.g., processing unit 106), a memory cache comprising a plurality of cache slots (e.g., memory cache 107), and control logic (109a) configured to implement at least a portion of method 1100.

In the example, the cache way-locking logic 114 of control logic 109a causes the microprocessor to perform act 1101 in order to partition the memory cache into a plurality of memory cache subsets that include: (i) a first memory cache subset comprising a first set of memory cache ways (e.g., memory cache subset 702c, or recorded context A's reserved way(s) in matrix 900) that are locked to a first execution context (e.g., recorded context A) whose execution is being recorded into a first trace buffer (e.g., a first of replayable execution trace(s) 112), and (ii) a second memory cache subset comprising a second set of memory cache ways (e.g., memory cache subset 702b, or recorded context B's reserved way(s) in matrix 900) that are locked to a second execution context (e.g., recorded context B) whose execution is being recorded into a second trace buffer (e.g., a second of replayable execution trace(s) 112).

In some embodiments, the first set of memory cache ways are locked to the first execution context based at least on a first ASID corresponding to the first execution context, and the second set of memory cache ways are locked to the second execution context based at least on a second ASID corresponding to the second execution context.

In the example, and in reference to cell 904, based on execution of the first execution context in act 1102a, the memory operation detection logic 115 of control logic 109a also causes the microprocessor to perform act 1102 in order to detect a first memory operation by the first execution context into the second memory cache subset. The logging logic 116 of control logic 109a also causes the microprocessor to perform act 1103 and act 1104 in order to, in response to detecting the first memory operation, perform at least one of: (i) when the first memory operation causes a first influx into the second memory cache subset, initiating logging of the first influx to the second trace buffer (i.e., cell 904, Influx); (ii) when the first memory operation is a first read from the second memory cache subset, initiating logging of the first read to the first trace buffer (i.e., cell 904, Read); or (iii) when the first memory operation is a first write to the second memory cache subset, performing one of (a) initiating logging of the first write to the second trace buffer, or (b) evicting a first cache line that is a target of the first write (i.e., cell 904, Write). In embodiments, this performance of method 1100 has a technical effect of logging the effects of a memory operation caused by the first execution context, and which affects the second memory cache subset reserved for the second execution context.

In one continuation of the example, and in reference to cell 906, based on execution of the second execution context in act 1102b, the memory operation detection logic 115 of control logic 109a also causes the microprocessor to perform act 1102 in order to detect a second memory operation by the second execution context into the first memory cache subset. The logging logic 116 of control logic 109a also causes the microprocessor to perform act 1103 and act 1104 in order to, in response to detecting the second memory operation, perform at least one of: (i) when the second memory operation causes a second influx into the first memory cache subset, initiating logging of the second influx to the first trace buffer (i.e., cell 906, Influx); (ii) when the second memory operation is a second read from the first memory cache subset, initiating logging of the second read to the second trace buffer (i.e., cell 906, Read); or (iii) when the second memory operation is a second write to the first memory cache subset, performing one of (a) initiating logging of the second write to the first trace buffer, or (b) evicting a second cache line that is a target of the second write (i.e., cell 906, Write). In embodiments, this performance of method 1100 has a technical effect of logging the effects of a memory operation caused by the second execution context, and which affects the first memory cache subset reserved for the first execution context.

In another continuation of the example, the plurality of memory cache subsets also include: (iii) a third memory cache subset comprising a third set of memory cache ways (e.g., memory cache subset 702a, or the unreserved way(s) in matrix 900) that are not locked to any execution context, such as an unrecorded third execution context. In reference to cell 909, based on execution of the third execution context in act 1102c, the memory operation detection logic 115 of control logic 109a also causes the microprocessor to perform act 1102 in order to detect a second memory operation by the third execution context into the first memory cache subset. The logging logic 116 of control logic 109a also causes the microprocessor to perform act 1103 and act 1104 in order to, in response to detecting the second memory operation, perform at least one of: (i) when the second memory operation causes a second influx into the first memory cache subset, initiating logging of the second influx to the first trace buffer (i.e., cell 909, Influx); or (ii) when the second memory operation is a second write to the first memory cache subset, performing one of (a) initiating logging of the second write to the first trace buffer, or (b) evicting a second cache line that is a target of the second write (i.e., cell 909, Write). In embodiments, this performance of method 1100 has a technical effect of logging the effects of a memory operation caused by an unrecorded execution context, and which affects the first memory cache subset reserved for the first execution context.

In another continuation of the example, the plurality of memory cache subsets also include: (iii) a third memory cache subset comprising a third set of memory cache ways (e.g., memory cache subset 702a, or the unreserved way(s) in matrix 900) that are not locked to any execution context, such as an unrecorded third execution context. In reference to cell 910, based on execution of the third execution context in act 1102c, the memory operation detection logic 115 of control logic 109a also causes the microprocessor to perform act 1102 in order to detect a second memory operation by the third execution context into the second memory cache subset. The logging logic 116 of control logic 109a also causes the microprocessor to perform act 1103 and act 1104 in order to, in response to detecting the second memory operation, perform at least one of: (i) when the second memory operation causes a second influx into the second memory cache subset, initiating logging of the second influx to the second trace buffer (i.e., cell 910, Influx); or (ii) when the second memory operation is a second write to the second memory cache subset, performing one of (a) initiating logging of the second write to the second trace buffer, or (b) evicting a second cache line that is a target of the second write (i.e., cell 909, Write). In embodiments, this performance of method 1100 has a technical effect of logging the effects of a memory operation caused by an unrecorded execution context, and which affects the second memory cache subset reserved for the second execution context.

In another continuation of the example, the plurality of memory cache subsets also include: (iii) a third memory cache subset comprising a third set of memory cache ways (e.g., memory cache subset 702a, or the unreserved way(s) in matrix 900) that are not locked to any execution context, such as an unrecorded third execution context. In reference to cell 905, based on execution of the first execution context in act 1102a, the memory operation detection logic 115 of control logic 109a also causes the microprocessor to perform act 1102 in order to detect a second memory operation comprising a second read by the first execution context into the third memory cache subset. The logging logic 116 of control logic 109a also causes the microprocessor to perform act 1103 and act 1104 in order to, in response to detecting the second memory operation, initiate logging of the second read to the first trace buffer (i.e., cell 905, Read). In embodiments, this performance of method 1100 has a technical effect of logging the effects of a memory read operation caused by the first execution context from the unreserved third memory cache subset.

In another continuation of the example, the plurality of memory cache subsets also include: (iii) a third memory cache subset comprising a third set of memory cache ways (e.g., memory cache subset 702a, or the unreserved way(s) in matrix 900) that are not locked to any execution context, such as an unrecorded third execution context. In reference to cell 908, based on execution of the second execution context in act 1102b, the memory operation detection logic 115 of control logic 109a also causes the microprocessor to perform act 1102 in order to detect a second memory operation comprising a second read by the second execution context into the third memory cache subset. The logging logic 116 of control logic 109a also causes the microprocessor to perform act 1103 and act 1104 in order to, in response to detecting the second memory operation, initiate logging of the second read to the second trace buffer (i.e., cell 908, Read). In embodiments, this performance of method 1100 has a technical effect of logging the effects of a memory read operation caused by the second execution context from the unreserved third memory cache subset.

In another continuation of the example, and in reference to cell 903, based on execution of the first execution context in act 1102a, the memory operation detection logic 115 of control logic 109a also causes the microprocessor to perform act 1102 in order to detect a second memory operation by the first execution context that causes a second influx into the first memory cache subset. The logging logic 116 of control logic 109a also causes the microprocessor to perform act 1103 and act 1104 in order to, in response to detecting the second memory operation, initiate logging of the second influx to the first trace buffer (i.e., cell 903, Influx). In embodiments, this performance of method 1100 has a technical effect of logging an influx into the first memory cache subset, and which is caused by execution of the first execution context.

In another continuation of the example, and in reference to cell 907, based on execution of the second execution context in act 1102b, the memory operation detection logic 115 of control logic 109a also causes the microprocessor to perform act 1102 in order to detect a second memory operation by the second execution context that causes a second influx into the second memory cache subset. The logging logic 116 of control logic 109a also causes the microprocessor to perform act 1103 and act 1104 in order to, in response to detecting the second memory operation, initiate logging of the second influx to the second trace buffer (i.e., cell 907, Influx). In embodiments, this performance of method 1100 has a technical effect of logging in influx into the second memory cache subset, and which is caused by execution of the second execution context.

Notably, it may be possible for a processor to allow a single set of one or more ways to be reserved for plural executions contexts (e.g., context A and context B), but only for cache lines originating from a subset of memory (e.g., a subset of memory addresses, a subset of memory pages, etc.). In embodiments, in these situations logging logic 116 implements the same behaviors when logging based on way-locking as logging logic 122 (discussed infra) implements for cell 1005, cell 1009, and cell 1013 in column 1002c of FIG. 10 (discussed infra) when logging based on memory page markings.

Accordingly, at least some embodiments described herein utilize memory cache way-locking features to determine an execution trace into which the effects of a given memory operation should be recorded, in order to achieve a technical effect of efficiently recording independently-replayable execution traces during simultaneous/interleaved execution of plural execution contexts.

In some embodiments, processor support for using memory page markings as logging cues for bit-accurate tracing is extended to support recording simultaneous/interleaved execution of plural execution contexts into corresponding independently-replayable execution traces. As discussed, using memory page markings as logging cues for bit-accurate tracing generally operates by maintaining an in-memory data structure (e.g., data structure 113) that categorizes different memory regions (e.g., physical memory pages) as being logged or not logged, and then the control logic 109 uses this data structure to make logging decisions during code execution based on whether a cache line is sourced from a memory region that is categorized/ marked as logged or not logged. The embodiments herein extend these techniques by expanding the memory page markings (e.g., within data structure 113) to also specify one or more particular execution contexts that are to be logged, such that a given memory page can be categorized as (i) logged for one or more particularly specified execution contexts which are each assigned to a different execution trace buffer, or (ii) not logged. Then, when any execution context other than a particular execution context for which a particular memory region is tagged as logged causes an influx from or a write to that particular memory region, the embodiments log the influx/write into the particular execution context's execution trace. When combined with other memory page marking tracing techniques that record memory operations caused by execution of each traced execution context, itself, these embodiments enable each execution trace to contain memory data sufficient to replay memory operations of the execution trace's corresponding traced execution context.

In some embodiments, the memory page markings are expanded such that, for each memory page, a marking indicates whether the page is to be logged for each of a plurality of execution contexts (e.g., as a bitmap, with one bit per recorded execution context being used to indicate if accesses to the page should be recorded for the context or not). These embodiments incur the cost, for each memory page, of at least one bit for each possible recorded execution context, but provide a benefit producing a quickly accessible data structure. In other embodiments, the memory page markings are expanded such that, for each memory page, a marking indicates (i) whether the page is to be logged, and (ii) for which execution context(s) the page is to be logged. These embodiments only incur the cost of specifying recorded execution contexts when a memory page is marked to be logged and enable flexibility in data structure layout (e.g., a PTE/PDE), with the possible drawback of having slower data structure accesses than the former embodiment.

FIG. 1C illustrates additional detail of control logic 109b, including components that operate to use memory page markings as logging cues to simultaneously record plural execution contexts into independent execution traces. The depicted components of control logic 109b, together with any sub-components, represent various functions that the control logic 109b might implement or utilize in accordance with various embodiments described herein. It will be appreciated, however, that the depicted components-including their identity, sub-components, and arrangement—are presented merely as an aid in describing various embodiments of the control logic 109b described herein, and that these components are non-limiting to how software and/or hardware might implement various embodiments of the control logic 109b described herein, or of the particular functionality thereof.

As shown, the control logic 109b comprises memory operation detection logic 120 and memory marking identification logic 121. In general, the memory operation detection logic 120 detects when an execution context has requested a memory operation that affects the memory cache 107. In addition, the memory operation detection logic 120 identifies a type of the memory operation (e.g., read or write), whether the memory operation caused an influx into the memory cache 107, and which execution context requested the memory operation. Based on a detected memory operation, the memory marking identification logic 121 uses markings stored in memory-based data structure (e.g., data structure 113), and potentially cached to the TLB 108, to determine if a memory page corresponding to an address of the memory operation is marked as being logged for one or more identified execution contexts, or as being not logged.

Figure 8:
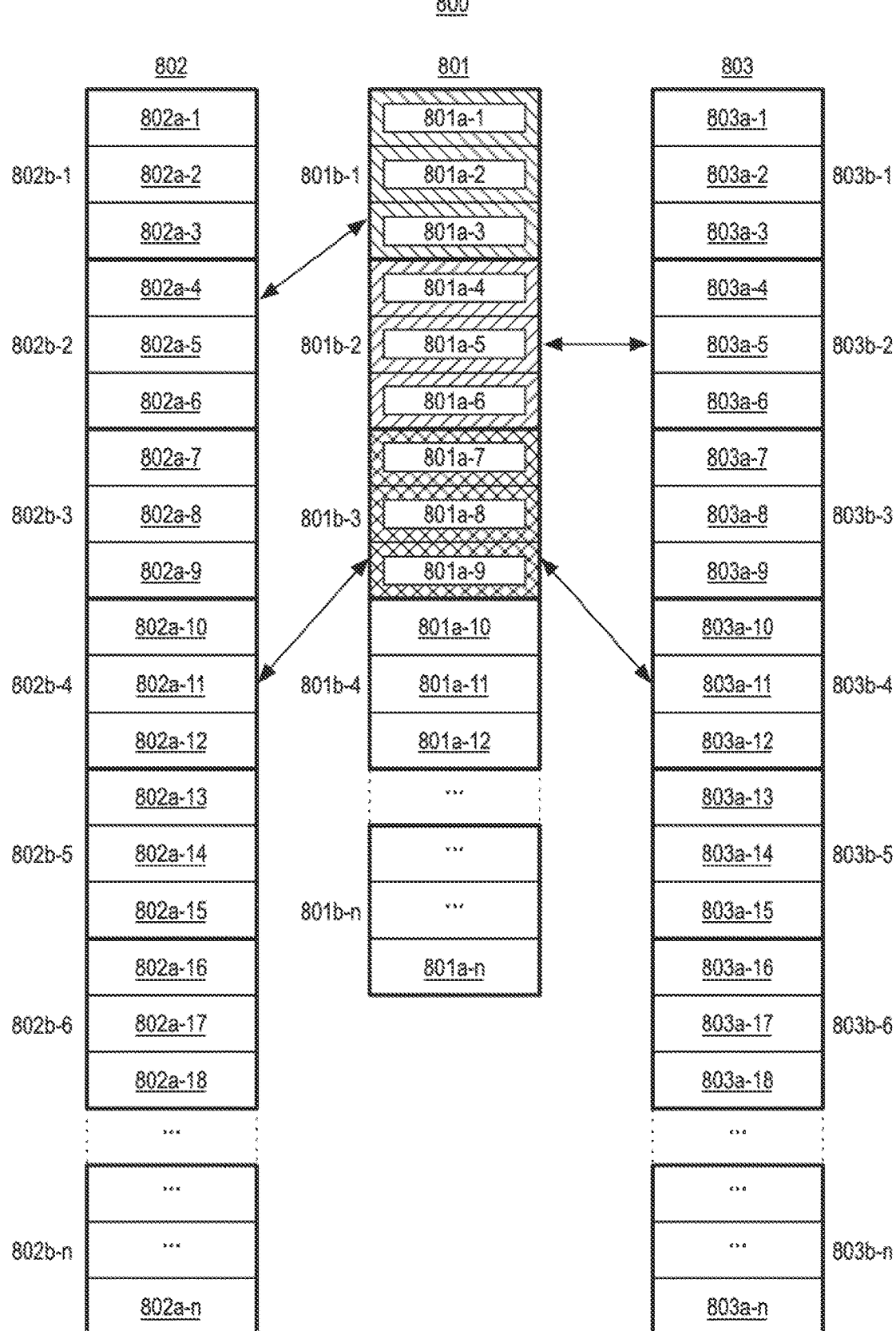
FIG. 8 illustrates an example of physical to virtual memory address space mappings, including use of memory markings as logging cues for plural execution contexts.

For example, FIG. 8 illustrates an example 800 of physical to virtual memory address space mappings, including use of memory markings as logging cues for plural execution contexts. As illustrated, example 800 shows a physical address space 801 (e.g., corresponding to physical addresses in system memory 103) and two virtual address spaces (i.e., virtual address space 802 and virtual address space 803), each corresponding to some execution context (e.g., context A for virtual address space 802 and context B for virtual address space 803). Each address space is shown as including a plurality of addressable memory locations (i.e., physical memory location 801a-1 to physical memory location 801a-n for physical address space 801, virtual memory location 802a-1 to virtual memory location 802a-n for virtual address space 802, and virtual memory location 803a-1 to virtual memory location 803a-n for virtual address space 803). In addition, in each address space, these addressable memory locations are shown as being arranged into different memory pages (i.e., physical memory page 801b-1 to physical memory page 801b-n for physical address space 801, virtual memory page 802b-1 to virtual memory page 802b-n for virtual address space 802, and virtual memory page 803b-1 to virtual memory page 803b-n for virtual address space 803).

As indicated by an arrow between physical memory page 801b-1 in physical address space 801 and virtual memory page 802b-2 in virtual address space 802, there is a first region of physical address space 801 (i.e., physical memory location 801a-1 to physical memory location 801a-3) that maps to a first region of virtual address space 802 (i.e., virtual memory location 802a-4 to virtual memory location 802a-6). In addition, indicated by an arrow between physical memory page 801b-2 in physical address space 801 and virtual memory page 803b-2 in virtual address space 803, there is a second region of physical address space 801 (i.e., physical memory location 801a-4 to physical memory location 801a-6) that maps to a first region of virtual address space 803 (i.e., virtual memory location 803a-4 to virtual memory location 803a-6). In addition, as indicated by a first arrow between physical memory page 801b-3 in physical address space 801 and virtual memory page 802b-4 in virtual address space 802, and a second arrow between physical memory page 801b-3 in physical address space 801 and virtual memory page 803b-4 in virtual address space 803, there is also a second region of physical address space 801 (i.e., physical memory location 801a-7 to physical memory location 801a-9) that maps to both of (i) a second region of virtual address space 802 (i.e., virtual memory location 802a-10 to virtual memory location 802a-12) and (ii) a second region of virtual address space 803 (i.e., virtual memory location 803a-10 to virtual memory location 803a-12).

In example 800, physical memory page 801b-1 is shaded with left-slanted diagonal lines to indicate that this memory page is marked as being logged for a first execution context (e.g., context A, corresponding to virtual address space 802). In addition, physical memory page 801b-2 is shaded with right-slanted diagonal lines to indicate that this memory page is marked as being logged for a second execution context (e.g., context B, corresponding to virtual address space 803). In addition, physical memory page 801b-3 is shaded with crossed diagonal lines to indicate that this memory page is marked as being logged for both of the first execution context and the second execution context. The other physical memory pages are shown without any shading, indicating they are marked as being not logged.

The control logic 109b also comprises logging logic 122. In general, the logging logic 122 uses a combination of (i) which execution context requested a memory operation, (ii) which physical memory page was affected by the memory operation, (iii) an identified marking (logging cue) for that memory page, and (iv) a result of the memory operation (e.g., one or more of influx to the memory cache 107, read, or write) to determine whether to log the memory operation (i.e., using logging action determination logic 123), and if so to which trace buffer (i.e., using logging buffer determination logic 124). When the logging action determination logic 123 determines that a memory operation should be logged, logging initiation logic 125 initiates that logging to the chosen trace buffer.

Example operation of the logging logic 122 is now described in connection with FIG. 10, which illustrates an example matrix 1000 of logging actions for using memory page markings as logging cues to record simultaneous execution of plural execution contexts into independently-replayable execution traces. As indicated in cell 1001*a*, cell 1001*b*, and cell 1001*c*, matrix 1000 includes a row for each of: recorded context A, recorded context B, and unrecorded context(s). As indicated in cell 1002*a*, cell 1002*b*, cell 1002*c*, and cell 1002*d*, matrix 1000 includes a column for each of: page(s) marked as logged for context A only (e.g., page 801*b*-1), page(s) marked as logged for context B only (e.g., page 801*b*-2), page(s) marked as logged for context A and context B (e.g., page 801*b*-3), and page(s) marked as not logged (e.g., page 801*b*-4). Each cell at an intersection of a corresponding row and a corresponding column indicates a logging action (or inaction) taken when the corresponding row's context performs a memory operation affecting the corresponding column's page(s). While matrix 1000 only shows two recorded contexts, the principles described herein can be applied to any number of recorded contexts.

Based on execution of each recorded execution context, the logging logic 122 logs, into that recorded execution context's execution trace, memory operations that cause influxes from memory pages that are marked as logged for any execution context, or that are reads from any memory pages that are not marked as logged for that execution context. This enables those influxes and reads to be reproduced from each recorded execution context's execution trace. For example, as shown in matrix 1000, when recorded context A causes an influx for a memory address within a memory page that is marked as logged for context A only, the logging logic 122 logs that influx into context A's execution trace (i.e., cell 1003, Influx); when recorded context A causes an influx for a memory address within a memory page that is marked as logged for both context A and context B, the logging logic 122 logs that influx into both of context A's execution trace and context B's execution trace (i.e., cell 1005, Influx); and when recorded context A reads from a memory address within any memory page that is not marked as logged for context A, the logging logic 122 logs that read into context A's execution trace (i.e., cell 1004 and cell 1006, Read). Similarly, when recorded context B causes an influx for a memory address within a memory page that is marked as logged for context B only, the logging logic 122 logs that influx into context B's execution trace (i.e., cell 1008, Influx); when recorded context B causes an influx for a memory address within a memory page that is marked as logged for both context A and context B, the logging logic 122 logs that influx into both of context A's execution trace and context B's execution trace (i.e., cell 1009, Influx); and when recorded context B reads from a memory address within any memory page that is not marked as logged for context B the logging logic 122 logs that read into context B's execution trace (i.e., cell 1007 and cell 1010, Read).

The logging logic 122 also logs, into a particular recorded execution context's execution trace, memory operations by other than the particular recorded execution context that cause influxes from memory pages that are marked as logged for the particular recorded execution context. Since the particular recorded execution context could later do a read from the influxed data without causing an influx itself, this enables those influxes to be reproduced from the particular recorded execution context's execution trace when replaying a read memory operation on behalf of the particular recorded execution context. For example, as shown in matrix 1000, when recorded context A or an unrecorded context causes an influx for a memory address within a memory page that is marked as logged for context B, the logging logic 122 logs that influx into context B's execution trace (i.e., cell 1004 and cell 1012, Influx); when recorded context B or an unrecorded context causes an influx for a memory address within a memory page that is marked as logged for context A, the logging logic 122 logs that influx into context A's execution trace (i.e., cell 1007 and cell 1011, Influx); and when an unrecorded context causes an influx for a memory address within a memory page that is marked as logged for both context A and context B, the logging logic 122 logs that influx into both of context A's execution trace and context B's execution trace (i.e., cell 1013, Influx).

For memory operations by other than a particular recorded execution context that write into memory pages that are marked as logged for the particular recorded execution context, in some embodiments the logging logic 122 logs the write into the particular recorded execution context's execution trace. Since the particular recorded execution context could later perform a read from the written data, this logging enables those writes to be reproduced from the particular recorded execution context's execution trace. In other embodiments, the logging logic 122 causes an eviction of any cache line that was the subject of the write. By doing an eviction, an influx would later be logged into the particular recorded execution context's trace if the particular recorded execution context were to subsequently access the written—to cache line. For example, as shown in matrix 1000, when recorded context A performs a write to a memory address within a memory page that is marked as logged for context B (but not context A), the logging logic 122 logs that write into context B's execution trace (i.e., cell 1004, Write), or evicts the written—to cache line (i.e., cell 1004, Write); and when recorded context B performs a write to a memory address within a memory page that is marked as logged for context A (but not context B), the logging logic 122 logs that write into context A's execution trace (i.e., cell 1007, Write), or evicts the written—to cache line (i.e., cell 1007, Write). Additionally, when recorded context A performs a write to a memory address within a memory page that is marked as logged for both of context A and context B, the logging logic 122 logs that write into context B's execution trace (i.e., cell 1005, Write), or evicts the written—to cache line (i.e., cell 1005, Write); and when recorded context B performs a write to a memory address within a memory page that is marked as logged for both of context A and context B, the logging logic 122 logs that write into context A's execution trace (i.e., cell 1009, Write), or evicts the written—to cache line (i.e., cell 1009, Write). Finally, when an unrecorded context performs a write to a memory address within a memory page that is marked as logged for context A only, the logging logic 122 logs that write into context A's execution trace (i.e., cell 1011, Write), or evicts the written—to cache line (i.e., cell 1004, Write); when an unrecorded context performs a write to a memory address within a memory page that is marked as logged for context B only, the logging logic 122 logs that write into context B's execution trace (i.e., cell 1012, Write), or evicts the written—to cache line (i.e., cell 1004, Write); and when an unrecorded context performs a write to a memory address within a memory page that is marked as logged for both context A and context B, the logging logic 122 logs that write into both of context A's execution trace and context B's execution trace (i.e., cell 1013, Write), or evicts the written—to cache line (i.e., cell 1013, Write). In yet other embodiments, the logging logic 122 signals the cache line as being not logged by marking the memory page from which the cache line was influxed as non-logged.

Notably, it is possible that a single memory operation could cause multiple logging actions. For example, referring to cell 1004, a read by context A from an address within a memory page that is marked as logged for context B could cause an influx into the memory cache 107; in this case, the logging logic 122 may log the influx into context B's execution trace, and may also log the read into context A's execution trace. Similarly, referring again to cell 1004, a write by context A to an address within a memory page that is marked as logged for context B could cause an influx into the memory cache 107; in this case, the logging logic 122 may log the influx into context B's execution trace, and may either log the read into to context B's execution trace or evict the written—to cache line. Similar multiple logging actions could result from a memory operation by context B to an address within a memory page that is marked as logged for context A (e.g., cell 1007).

Several cells have "no logging" actions (i.e., cell 1003, Read/Write; cell 1005, Read; cell 1006, Influx/Write; cell 1008, Read/Write; cell 1009, Read; cell 1010, Influx/Write; and cell 1014). In some embodiments one or more of these no logging actions could be logging actions; however, it will be appreciated by one of ordinary skill in the art that the logging actions already described are sufficient to reproduce memory operations by the recorded contexts.

In order to further describe operation of these components of control logic 109b, the following discussion now refers to a method and method acts. Although the method acts may be discussed in certain orders, or may be illustrated in a flow chart as occurring in a particular order, no particular ordering is required unless specifically stated, or required because an act is dependent on another act being completed prior to the act being performed.

FIG. 12 illustrates a flow chart of an example method 1200 for using memory page markings as logging cues to simultaneously record plural execution contexts into independent execution traces. Method 1200 will be described with respect to the components and data of computing environment 100. In embodiments, method 1200 is implemented based on control logic (e.g., control logic 109b) of a processor (e.g., processor 102) that comprises a processing unit (e.g., processing unit 106) and a memory cache (e.g., memory cache 107).

Method 1200 also comprises an act 1201 of executing an execution context at a processor. In an example of act 1201, the processor 102 executes a thread from code of operating environment 110 or an application 111. In FIG. 12, act 1201 can comprise executing a logged first execution context at the processor (act 1201a), executing a logged second execution context at the processor (act 1201b), or executing a non-logged third execution context at the processor (act 1201c). In embodiments, act 1201 has a technical effect of executing code that can perform a memory operation, thereby triggering act 1202.

Method 1200 also comprises an act 1202 of detecting a memory operation by the execution context, the memory operating targeting a memory address. In an example of act 1202, the memory operation detection logic 120 detects that execution of the execution context in act 1201 has resulted in a memory operation, which targets a particular memory address. The memory operation detection logic 120 can also identify result(s) of the memory operation (e.g., read, write, influx), and which execution context caused the memory operation. In embodiments, act 1202 has a technical effect of detecting a memory operation that may potentially need to be logged into an execution trace.

Method 1200 also comprises an act 1203 of identifying a memory marking corresponding to the memory address, the memory marking indicating if a memory region corresponding to the address should be logged and, if so, for which execution context(s). In an example of act 1203, the memory marking identification logic 121 consults markings-such as those demonstrated in connection with example 800-stored in an in-memory data structure (which are potentially cached to the TLB 108) to determine (i) if a marking for a memory page corresponding to the memory address is marked as logged, and (ii) if so, for which execution context(s). In embodiments, act 1203 has a technical effect of using a stored a memory page marking to determine whether a memory page that is a target of the memory operation includes a cue indicating that that memory operation may need to be logged for a given execution context.

Method 1200 also comprises an act 1204 of, based on an identity of the execution context, the memory marking, and an operation result, determining: (i) whether to log the memory operation and, when logging, (ii) one or more destination trace buffer(s). In an example of act 1201, the logging action determination logic 123 uses an identity of the execution context, the memory marking identified in act 1203, and an operation result (e.g., influx, read, write) to determine whether or not to perform one or more logging actions, and if so, what those action(s) are (e.g., log influx, log read, log write, evict). In embodiments, the logging action determination logic 123 follows matrix 1000 to determine the logging action(s). When the logging action determination logic 123 determines that one or more logging actions should be performed, the logging buffer determination logic 124 determines to which execution trace buffer (if any) each logging action should be targeted. In embodiments, the logging buffer determination logic 124 follows matrix 1000 to determine the applicable execution trace buffer(s), if any.

In some situations, method 1200 also comprises an act 1205 of logging one or more of an influx, a read, or a write to the destination trace buffer(s), or evicting a cache line. In an example of act 1205, when the logging action determination logic 123 has determined that one or more of a "log influx," a "log read," or a "log write," action is to be performed, the logging initiation logic 125 initiates that logging action to the execution trace buffer(s) identified by the logging buffer determination logic 124. In another example of act 1205, when the logging action determination logic 125 has determined that an eviction action is to be performed, the control logic 109b evicts a target cache line from the memory cache 107. Notably, act 1205 is shown in broken lines to indicate that act 1205 may not always be performed—for example, when the logging action determination logic 123 determines in act 1204 that no logging action is to be performed.

In embodiments, act 1204 and act 1205 have a technical effect of either (i) committing trace data to at least one replayable execution trace 112 that is usable to replay an executable context, or (ii) clearing a cache line from the memory cache 107. In embodiments, clearing a cache line from the memory cache 107 enables that cache line to be logged as an influx later, if it is later accessed by a recorded execution context.

As shown, there is an arrow extending from act 1205 to act 1201, indicating that method 1200 can repeat any number of times, with any of act 1201*a*, act 1201*b*, or act 1201*c* occurring in connection with each instance of act 1201.

In one example application of method 1200, some embodiments are directed to methods, systems, and computer program products for using memory page markings as logging cues to simultaneously record plural execution contexts into independent execution traces. In an embodiment, a microprocessor (e.g., processor 102) comprises a processing unit (e.g., processing unit 106), a memory cache comprising a plurality of cache slots (e.g., memory cache 107), and control logic (109*b*) configured to implement at least a portion of method 1200.

In the example, and in reference to cell 1004, based on execution of the first execution context in act 1201*a*, the memory operation detection logic 120 of control logic 109*b* causes the microprocessor to perform act 1202 in order to detect a first memory operation resulting from execution of a first execution context, the first memory operation targeting a first memory address. The memory marking identification logic 121 of control logic 109*b* also causes the microprocessor to perform act 1102 in order to, based on detecting the first memory operation, identify a first corresponding memory marking for the first memory operation, the first corresponding memory marking being one of a plurality of memory markings that include: (i) a first memory marking indicating that a first memory region (e.g., page 801*b*-1) is logged for the first execution context (e.g., recorded context A), execution of the first execution context being recorded into a first trace buffer (e.g., a first of replayable execution trace(s) 112); and (ii) a second memory marking indicating that a second memory region (e.g., page 801*b*-2) is logged for a second execution context (e.g., recorded context B), execution of the second execution context being recorded into a second trace buffer (e.g., a second of replayable execution trace(s) 112). The logging logic 122 of control logic 109*b* also causes the microprocessor to perform act 1104 and 1105 in order to, based on identifying the first corresponding memory marking as being the second memory marking, and based on the first memory operation resulting from execution of the first execution context, perform at least one of: (i) when the first memory operation causes a first influx into the memory cache, initiating logging of the first influx to the second trace buffer (i.e., cell 1004, Influx); (ii) when the first memory operation is a first read from the memory cache, initiating logging of the first read to the first trace buffer (i.e., cell 1004, Read); or (iii) when the first memory operation is a first write to the memory cache, performing one of (a) initiating logging of the first write to the second trace buffer, or (b) evicting a first cache line that is a target of the first write (i.e., cell 1004, Write). In embodiments, this performance of method 1200 has a technical effect of logging the effects of a memory operation caused by the first execution context, and which affects a memory page marked as logged for the second execution context.

In one continuation of the example, and in reference to cell 1007, based on execution of the second execution context in act 1201*b*, the memory operation detection logic 120 of control logic 109*b* causes the microprocessor to perform act 1202 in order to detect a second memory operation resulting from execution of the second execution context, the second memory operation targeting a second memory address. The memory marking identification logic 121 of control logic 109*b* also causes the microprocessor to perform act 1102 in order to, based on detecting the second memory operation, identify a second corresponding memory marking for the second memory operation, the second corresponding memory marking being one of the plurality of memory markings. The logging logic 122 of control logic 109*b* also causes the microprocessor to perform act 1104 and 1105 in order to, based on identifying the second corresponding memory marking as being the first memory marking, and based on the second memory operation resulting from execution of the second execution context, perform at least one of: (i) when the second memory operation causes a second influx into the memory cache, initiating logging of the second influx to the first trace buffer (i.e., cell 1007, Influx); (ii) when the second memory operation is a second read from the memory cache, initiating logging of the second read to the second trace buffer (i.e., cell 1007, Read); or (iii) when the second memory operation is a second write to the memory cache, performing one of (a) initiating logging of the second write to the first trace buffer, or (b) evicting a second cache line that is a target of the second write (i.e., cell 1007, Write). In embodiments, this performance of method 1200 has a technical effect of logging the effects of a memory operation caused by the second execution context, and which affects a memory page marked as logged for the first execution context.

In another continuation of the example, the plurality of memory markings also include: (iii) a third memory marking indicating that a third memory region (e.g., page 801*b*-3) is logged for both of the first execution context and the second execution context. In reference to cell 1005, based on execution of the first execution context in act 1201*a*, the memory operation detection logic 120 of control logic 109*b* causes the microprocessor to perform act 1202 in order to detect a second memory operation resulting from execution of the first execution context, the second memory operation targeting a second memory address. The memory marking identification logic 121 of control logic 109*b* also causes the microprocessor to perform act 1102 in order to, based on detecting the second memory operation, identify a second corresponding memory marking for the second memory operation, the second corresponding memory marking being one of the plurality of memory markings. The logging logic 122 of control logic 109*b* also causes the microprocessor to perform act 1104 and 1105 in order to, based on identifying the second corresponding memory marking as being the third memory marking, and based on the second memory operation resulting from execution of the first execution context, perform at least one of: (i) when the second memory operation causes a second influx into the memory cache, initiating logging of the second influx to both of the first trace buffer and the second trace buffer (i.e., cell 1005, Influx); or (ii) when the second memory operation is a second write to the memory cache, initiating logging of the second write to the second trace buffer (i.e., cell 1005, Write). In embodiments, this performance of method 1200 has a technical effect of logging the effects of a memory operation caused by the first execution context, and which affects a memory page marked as logged for both of the first execution context and the second execution context.

In another continuation of the example, the plurality of memory markings also include: (iii) a third memory marking indicating that a third memory region (e.g., page 801*b*-3) is logged for both of the first execution context and the second execution context. In reference to cell 1009, based on execution of the second execution context in act 1201*b*, the memory operation detection logic 120 of control logic 109*b* causes the microprocessor to perform act 1202 in order to detect a second memory operation resulting from execution of the second execution context, the second memory operation targeting a second memory address. The memory marking identification logic 121 of control logic 109*b* also causes the microprocessor to perform act 1102 in order to, based on detecting the second memory operation, identify a second corresponding memory marking for the second memory operation, the second corresponding memory marking being one of the plurality of memory markings. The logging logic 122 of control logic 109*b* also causes the microprocessor to perform act 1104 and 1105 in order to, based on identifying the second corresponding memory marking as being the third memory marking, and based on the second memory operation resulting from execution of the second execution context, perform at least one of: (i) when the second memory operation causes a second influx into the memory cache, initiating logging of the second influx to both of the first trace buffer and the second trace buffer (i.e., cell 1009, Influx); or (ii) when the second memory operation is a second write to the memory cache, initiating logging of the second write to the first trace buffer (i.e., cell 1009, Write). In embodiments, this performance of method 1200 has a technical effect of logging the effects of memory operation caused by the second execution context, and which affects a memory page marked as logged for both of the first execution context and the second execution context.

In another continuation of the example, and in reference to cell 1011, based on execution of a third execution context in act 1201*c*, the memory operation detection logic 120 of control logic 109*b* causes the microprocessor to perform act 1202 in order to detect a second memory operation resulting from execution of a third execution context, the second memory operation targeting a second memory address. The memory marking identification logic 121 of control logic 109*b* also causes the microprocessor to perform act 1102 in order to, based on detecting the second memory operation, identify a second corresponding memory marking for the second memory operation, the second corresponding memory marking being one of the plurality of memory markings. The logging logic 122 of control logic 109*b* also causes the microprocessor to perform act 1104 and 1105 in order to, based on identifying the second corresponding memory marking as being the first memory marking, and based on the second memory operation resulting from execution of the third execution context, perform at least one of: (i) when the second memory operation causes a second influx into the memory cache, initiating logging of the second influx to the first trace buffer (e.g., cell 1011, Influx); or (ii) when the second memory operation is a second write to the memory cache, performing one of (a) initiating logging of the second write to the first trace buffer, or (b) evicting a second cache line that is a target of the second write (e.g., cell 1011, Write). In embodiments, this performance of method 1200 has a technical effect of logging the effects of a memory operation caused by an unrecorded execution context, and which affects a memory page marked as logged for the first execution context.

In another continuation of the example, and in reference to cell 1012, based on execution of a third execution context in act 1201*c*, the memory operation detection logic 120 of control logic 109*b* causes the microprocessor to perform act 1202 in order to detect a second memory operation resulting from execution of a third execution context, the second memory operation targeting a second memory address. The memory marking identification logic 121 of control logic

109*b* also causes the microprocessor to perform act 1102 in order to, based on detecting the second memory operation, identify a second corresponding memory marking for the second memory operation, the second corresponding memory marking being one of the plurality of memory markings. The logging logic 122 of control logic 109*b* also causes the microprocessor to perform act 1104 and 1105 in order to, based on identifying the second corresponding memory marking as being the second memory marking, and based on the second memory operation resulting from execution of the third execution context, perform at least one of: (i) when the second memory operation causes a second influx into the memory cache, initiating logging of the second influx to the second trace buffer (e.g., cell 1012, Influx); or (ii) when the second memory operation is a second write to the memory cache, performing one of (a) initiating logging of the second write to the second trace buffer, or (b) evicting a second cache line that is a target of the second write (e.g., cell 1012, Write). In embodiments, this performance of method 1200 has a technical effect of logging the effects of a memory operation caused by an unrecorded execution context, and which affects a memory page marked as logged for the second execution context.

In another continuation of the example, the plurality of memory markings also include: (iii) a third memory marking indicating that a third memory region (e.g., page 801*b*-3) is logged for both of the first execution context and the second execution context. In reference to cell 1013, based on execution of a third execution context in act 1201*c*, the memory operation detection logic 120 of control logic 109*b* causes the microprocessor to perform act 1202 in order to detect a second memory operation resulting from execution of a third execution context, the second memory operation targeting a second memory address. The memory marking identification logic 121 of control logic 109*b* also causes the microprocessor to perform act 1102 in order to, based on detecting the second memory operation, identify a second corresponding memory marking for the second memory operation, the second corresponding memory marking being one of the plurality of memory markings. The logging logic 122 of control logic 109*b* also causes the microprocessor to perform act 1104 and 1105 in order to, based on identifying the second corresponding memory marking as being the third memory marking, and based on the second memory operation resulting from execution of the third execution context, perform at least one of: (i) when the second memory operation causes a second influx into the memory cache, initiating logging of the second influx to both of the first trace buffer and the second trace buffer (e.g., cell 1013, Influx); or (ii) when the second memory operation is a second write to the memory cache, performing one of (a) initiating logging of the second influx to both of the first trace buffer and the second trace buffer, or (b) evicting a second cache line that is a target of the second write (e.g., cell 1013, Write). In embodiments, this performance of method 1200 has a technical effect of logging the effects of a memory operation caused by an unrecorded execution context, and which affects a memory page marked as logged for both of the first execution context and the second execution context.

In another continuation of the example, and in reference to cell 1003, based on execution of the first execution context in act 1201*a*, the memory operation detection logic 120 of control logic 109*b* causes the microprocessor to perform act 1202 in order to detect a second memory operation resulting from execution of the first execution context, the second memory operation targeting a second memory address. The memory marking identification logic 121 of control logic 109*b* also causes the microprocessor to perform act 1102 in order to, based on detecting the second memory operation, identify a second corresponding memory marking for the second memory operation, the second corresponding memory marking being one of the plurality of memory markings. The logging logic 122 of control logic 109*b* also causes the microprocessor to perform act 1104 and 1105 in order to, based on identifying the second corresponding memory marking as being the first memory marking, based on the second memory operation resulting from execution of the first execution context, and based on the second memory operation causing a second influx into the memory cache, initiating logging of the second influx to the first trace buffer (e.g., cell 1003, Influx). In embodiments, this performance of method 1200 has a technical effect of logging an influx from a memory page marked as logged for the first execution context, and which is caused by execution of the first execution context.

In another continuation of the example, and in reference to cell 1008, based on execution of the second execution context in act 1201*b*, the memory operation detection logic 120 of control logic 109*b* causes the microprocessor to perform act 1202 in order to detect a second memory operation resulting from execution of the second execution context, the second memory operation targeting a second memory address. The memory marking identification logic 121 of control logic 109*b* also causes the microprocessor to perform act 1102 in order to, based on detecting the second memory operation, identify a second corresponding memory marking for the second memory operation, the second corresponding memory marking being one of the plurality of memory markings. The logging logic 122 of control logic 109*b* also causes the microprocessor to perform act 1104 and 1105 in order to, based on identifying the second corresponding memory marking as being the second memory marking, based on the second memory operation resulting from execution of the second execution context, and based on the second memory operation causing a second influx into the memory cache, initiating logging of the second influx to the second trace buffer (e.g., cell 1008, Influx). In embodiments, this performance of method 1200 has a technical effect of logging an influx from a memory page marked as logged for the second execution context, and which is caused by execution of the second execution context.

In another continuation of the example, the plurality of memory markings also include: (iii) a third memory marking indicating that a third memory region (e.g., page 801*b*-4) is not logged for any execution context. In reference to cell 1006, based on execution of the first execution context in act 1201*a*, the memory operation detection logic 120 of control logic 109*b* causes the microprocessor to perform act 1202 in order to detect a second memory operation resulting from execution of the first execution context, the second memory operation targeting a second memory address. The memory marking identification logic 121 of control logic 109*b* also causes the microprocessor to perform act 1102 in order to, based on detecting the second memory operation, identify a second corresponding memory marking for the second memory operation, the second corresponding memory marking being one of the plurality of memory markings. The logging logic 122 of control logic 109*b* also causes the microprocessor to perform act 1104 and 1105 in order to, based on identifying the second corresponding memory marking as being the third memory marking, based on the second memory operation resulting from execution of the first execution context, and based on the second memory operation being a second read from the memory cache, initiating logging of the second read to the first trace buffer (i.e., cell 1006, Read). In embodiments, this performance of method 1200 has a technical effect of logging the effects of a memory read operation caused by the first execution context from a memory page marked as not logged.

In another continuation of the example, the plurality of memory markings also include: (iii) a third memory marking indicating that a third memory region (e.g., page 801*b*-4) is not logged for any execution context. In reference to cell 1010, based on execution of the second execution context in act 1201*b*, the memory operation detection logic 120 of control logic 109*b* causes the microprocessor to perform act 1202 in order to detect a second memory operation resulting from execution of the second execution context, the second memory operation targeting a second memory address. The memory marking identification logic 121 of control logic 109*b* also causes the microprocessor to perform act 1102 in order to, based on detecting the second memory operation, identify a second corresponding memory marking for the second memory operation, the second corresponding memory marking being one of the plurality of memory markings. The logging logic 122 of control logic 109*b* also causes the microprocessor to perform act 1104 and 1105 in order to, based on identifying the second corresponding memory marking as being the third memory marking, based on the second memory operation resulting from execution of the second execution context, and based on the second memory operation being a second read from the memory cache, initiating logging of the second read to the second trace buffer (i.e., cell 1010, Read). In embodiments, this performance of method 1200 has a technical effect of logging the effects of a memory read operation caused by the second execution context from a memory page marked as not logged.

Accordingly, at least some embodiments described herein utilize memory page markings as logging cues to determine an execution trace into which the effects of a given memory operation should be recorded, in order to achieve a technical effect of efficiently recording independently-replayable execution traces during simultaneous/interleaved execution of plural execution contexts.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A processor comprising:
a processing unit;
a memory cache; and
control logic that configures the processor to record plural execution contexts into independent execution traces by:
    detecting a first memory operation resulting from execution of a first execution context executing at the processor, the first memory operation targeting a first memory address;
    based on detecting the first memory operation, identifying a first corresponding memory marking for the first memory operation, the first corresponding memory marking being one of a plurality of memory markings that include: (i) a first memory marking indicating that a first memory region is logged for the first execution context, execution of the first execution context being recorded into a first trace buffer; and (ii) a second memory marking indicating that a second memory region is logged for a second execution context, execution of the second execution context being recorded into a second trace buffer;
    based on identifying the first corresponding memory marking as being the second memory marking, and based on the first memory operation resulting from execution of the first execution context, performing at least one of:
        (i) when the first memory operation causes a first influx into the memory cache, initiating logging of the first influx to the second trace buffer;
        (ii) when the first memory operation is a first read from the memory cache, initiating logging of the first read to the first trace buffer; or
        (iii) when the first memory operation is a first write to the memory cache, performing one of (a) initiating logging of the first write to the second trace buffer, or (b) evicting a first cache line that is a target of the first write;
    detect a second memory operation resulting from execution of the first execution context, the second memory operation targeting a second memory address;
    identify a second corresponding memory marking for the second memory operation based on detecting the second memory operation, the second corresponding memory marking being one of the plurality of memory markings; and
    initiating logging of a second influx to the first trace buffer, based on identifying the second corresponding memory marking as being the first memory marking, based on the second memory operation resulting from execution of the first execution context, and based on the second memory operation causing the second influx into the memory cache.

2. The processor of claim 1, wherein the first memory operation causes the first influx into the memory cache, and the control logic causes the processor to initiate logging of the first influx to the second trace buffer.

3. The processor of claim 1, wherein the first memory operation is the first read from the memory cache, and the control logic causes the processor to initiate logging of the first read to the first trace buffer.

4. The processor of claim 1, wherein the first memory operation is the first write to the memory cache, and the control logic causes the processor to initiate logging of the first write to the second trace buffer.

5. The processor of claim 1, wherein the first memory operation is the first write to the memory cache, and the control logic causes the processor to evict the first cache line that is the target of the first write.

6. The processor of claim 1, wherein the control logic also configures the processor to:
    detect a third memory operation resulting from execution of the second execution context, the third memory operation targeting a third memory address;
    based on detecting the third memory operation, identify a third corresponding memory marking for the third memory operation, the third corresponding memory marking being one of the plurality of memory markings; and
    based on identifying the third corresponding memory marking as being the first memory marking, and based on the third memory operation resulting from execution of the second execution context, perform at least one of:
        (i) when the third memory operation causes a third influx into the memory cache, initiating logging of the third influx to the first trace buffer;
        (ii) when the third memory operation is a second read from the memory cache, initiating logging of the second read to the second trace buffer; or
        (iii) when the third memory operation is a second write to the memory cache, performing one of (a) initiating logging of the second write to the first trace buffer, or (b) evicting a second cache line that is a target of the second write.

7. The processor of claim 6, wherein the third memory operation causes the third influx into the memory cache, and the control logic causes the processor to initiate logging of the third influx to the first trace buffer.

8. The processor of claim 6, wherein the third memory operation is the second read from the memory cache, and the control logic causes the processor to initiate logging of the second read to the second trace buffer.

9. The processor of claim 6, wherein the third memory operation is the second write to the memory cache, and the control logic causes the processor to initiate logging of the second write to the first trace buffer.

10. The processor of claim 6, wherein the third memory operation is the second write to the memory cache, and the control logic causes the processor to evict the second cache line that is the target of the second write.

11. The processor of claim 1, wherein the plurality of memory markings also include: (iii) a third memory marking indicating that a third memory region is logged for both of the first execution context and the second execution context, and wherein the control logic also configures the processor to:
    detect a third memory operation resulting from execution of the first execution context, the third memory operation targeting a third memory address;
    based on detecting the third memory operation, identify a third corresponding memory marking for the third memory operation, the third corresponding memory marking being one of the plurality of memory markings; and based on identifying the third corresponding memory marking as being the third memory marking, and based on the third memory operation resulting from execution of the first execution context, perform at least one of:

(i) when the third memory operation causes a third influx into the memory cache, initiating logging of the third influx to both of the first trace buffer and the second trace buffer; or (ii) when the third memory operation is a second write to the memory cache, initiating logging of the second write to the second trace buffer.

12. The processor of claim 11, wherein the third memory operation causes the third influx into the memory cache, and the control logic causes the processor to initiate logging of the third influx to both of the first trace buffer and the second trace buffer.

13. The processor of claim 11, wherein the third memory operation is the second write to the memory cache, and the control logic causes the processor to initiate logging of the second write to the second trace buffer.

14. The processor of claim 1, wherein the control logic also configures the processor to:

detect a third memory operation resulting from execution of a third execution context, the third memory operation targeting a third memory address;

based on detecting the third memory operation, identify a third corresponding memory marking for the third memory operation, the third corresponding memory marking being one of the plurality of memory markings; and based on identifying the third corresponding memory marking as being the first memory marking, and based on the third memory operation resulting from execution of the third execution context, perform at least one of:

(i) when the third memory operation causes a third influx into the memory cache, initiating logging of the third influx to the first trace buffer; or (ii) when the third memory operation is a second write to the memory cache, performing one of (a) initiating logging of the second write to the first trace buffer, or (b) evicting a second cache line that is a target of the second write.

15. A method, implemented at a processor that includes a processing unit and a memory cache, the method comprising:

detecting a first memory operation resulting from execution of a first execution context executing at the processor, the first memory operation targeting a first memory address;

based on detecting the first memory operation, identifying a first corresponding memory marking for the first memory operation, the first corresponding memory marking being one of a plurality of memory markings that include: (i) a first memory marking indicating that a first memory region is logged for the first execution context, execution of the first execution context being recorded into a first trace buffer; and (ii) a second memory marking indicating that a second memory region is logged for a second execution context, execution of the second execution context being recorded into a second trace buffer;

based on identifying the first corresponding memory marking as being the second memory marking, and based on the first memory operation resulting from execution of the first execution context, performing at least one of:

(i) when the first memory operation causes a first influx into the memory cache, initiating logging of the first influx to the second trace buffer;

(ii) when the first memory operation is a first read from the memory cache, initiating logging of the first read to the first trace buffer; or (iii) when the first memory operation is a first write to the memory cache, performing one of (a) initiating logging of the first write to the second trace buffer, or (b) evicting a first cache line that is a target of the first write;

detecting a second memory operation resulting from execution of the first execution context, the second memory operation targeting a second memory address;

identifying a second corresponding memory marking for the second memory operation based on detecting the second memory operation, the second corresponding memory marking being one of the plurality of memory markings; and initiating logging of a second influx to the first trace buffer, based on identifying the second corresponding memory marking as being the first memory marking, based on the second memory operation resulting from execution of the first execution context, and based on the second memory operation causing the second influx into the memory cache.

16. The method of claim 15, wherein the first memory operation causes the first influx into the memory cache, and the processor initiates logging of the first influx to the second trace buffer.

17. The method of claim 15, wherein the first memory operation is the first read from the memory cache, and the processor initiates logging of the first read to the first trace buffer.

18. The method of claim 15, wherein the first memory operation is the first write to the memory cache, and the processor initiates logging of the first write to the second trace buffer.

19. The method of claim 15, wherein the first memory operation is the first write to the memory cache, and the processor evicts the first cache line that is the target of the first write.

* * * * *